(12) United States Patent
Kuznarik et al.

(10) Patent No.: US 7,516,997 B2
(45) Date of Patent: Apr. 14, 2009

(54) COMPACT TRUCK TAILGATE AND GENERAL PURPOSE UTILITY LADDER

(75) Inventors: John Kuznarik, 2912 Duffer Rd., Sebring, FL (US) 33872; Evelio Acosta, Sunny Isles, FL (US); Roberto Diaz, Miami, FL (US)

(73) Assignee: John Kuznarik, Sebring, FL (US)

( * ) Notice: Subject to any disclaimer, the term of this patent is extended or adjusted under 35 U.S.C. 154(b) by 0 days.

(21) Appl. No.: 11/984,498

(22) Filed: Nov. 19, 2007

(65) Prior Publication Data

US 2008/0136208 A1    Jun. 12, 2008

Related U.S. Application Data

(63) Continuation-in-part of application No. 11/436,081, filed on May 18, 2006, now abandoned, which is a continuation-in-part of application No. 11/133,353, filed on May 20, 2005, now Pat. No. 7,240,947.

(51) Int. Cl.
    B62D 25/00    (2006.01)
(52) U.S. Cl. .......................... 296/62; 182/127; 182/88; 280/163
(58) Field of Classification Search ............... 296/62; 182/127; 280/163; 105/443, 449
    See application file for complete search history.

(56) References Cited

U.S. PATENT DOCUMENTS

| | | | |
|---|---|---|---|
| 1,148,356 A | 7/1915 | Chickering |
| 2,279,329 A | 4/1942 | King |
| 2,642,217 A | 6/1953 | Jennings |
| 2,647,677 A | 8/1953 | Reed |
| 3,008,533 A | 11/1961 | Haberle |
| 3,434,566 A | 3/1969 | Miller |
| 3,645,557 A | 2/1972 | Aldropp et al. |
| 3,669,218 A | 6/1972 | Hall |
| 3,782,774 A | 1/1974 | Sturek |
| 3,858,905 A | 1/1975 | Peebles |
| 4,139,078 A | 2/1979 | Keller |
| 4,161,997 A | 7/1979 | Norman |
| 4,216,725 A | 8/1980 | Hallam |
| 4,245,716 A | 1/1981 | Rayfield |
| 4,347,638 A | 9/1982 | Weaver |
| 4,669,574 A | 6/1987 | Moutot |
| 4,757,876 A | 7/1988 | Peacock |
| 4,848,821 A | 7/1989 | Liewellyn |
| 4,860,854 A | 8/1989 | Lodholz, Jr. |
| 5,028,063 A | 7/1991 | Andrews |
| 5,143,324 A | 9/1992 | Cornelius et al. |
| 5,224,748 A | 7/1993 | Decker et al. |
| 5,228,707 A | 7/1993 | Yoder |
| 5,312,150 A | 5/1994 | Quam |
| 5,366,052 A | 11/1994 | Keh-Lin |
| 5,672,152 A | 9/1997 | Mason et al. |

(Continued)

*Primary Examiner*—Jason S Morrow
(74) *Attorney, Agent, or Firm*—Venable LLP; Clifton E. McCann; Steven J. Schwarz

(57) ABSTRACT

According to an exemplary embodiment, and apparatus includes: a non-collapsible single unit stair including: a pair of opposing side rails supporting at least a top step and a bottom step; and a rotator unit including a lower portion secured to a substantially horizontal surface, and an upper portion mounting the non-collapsible single unit stair, wherein the lower portion and the upper portion are rotatable with respect to one another about an axis oriented substantially perpendicular to the substantially horizontal surface.

11 Claims, 24 Drawing Sheets

U.S. PATENT DOCUMENTS

| | | |
|---|---|---|
| 5,697,470 A | 12/1997 | Carle |
| 5,732,996 A | 3/1998 | Graffy et al. |
| 6,116,378 A | 9/2000 | Barrow |
| 6,173,812 B1 | 1/2001 | Spivey et al. |
| 6,270,139 B1 | 8/2001 | Simpson |
| 6,347,686 B1 | 2/2002 | Hedley et al. |
| 6,450,290 B1 | 9/2002 | Spak |
| 6,505,708 B2 | 1/2003 | LaBrash |
| 6,942,271 B1 | 9/2005 | Jamison et al. |
| 7,025,174 B1 | 4/2006 | Hawley |
| 7,055,838 B2 | 6/2006 | Lambie |
| 7,080,713 B1 | 7/2006 | Riggs |
| 7,111,858 B2 | 9/2006 | Manser et al. |
| 7,168,722 B1 | 1/2007 | Piotrowski et al. |
| 7,182,175 B1 | 2/2007 | Schmitt et al. |
| 7,240,947 B2 | 7/2007 | Kuznarik et al. |
| 2006/0261623 A1 | 11/2006 | Kuznarik |
| 2006/0272895 A1 | 12/2006 | Lavoie |
| 2006/0272896 A1 | 12/2006 | Rajewski |
| 2007/0096422 A1 | 5/2007 | Dolan |
| 2007/0182194 A1 | 8/2007 | Wood et al. |
| 2007/0205632 A1 | 9/2007 | Faulkiner |
| 2007/0240936 A1 | 10/2007 | Brookshire et al. |

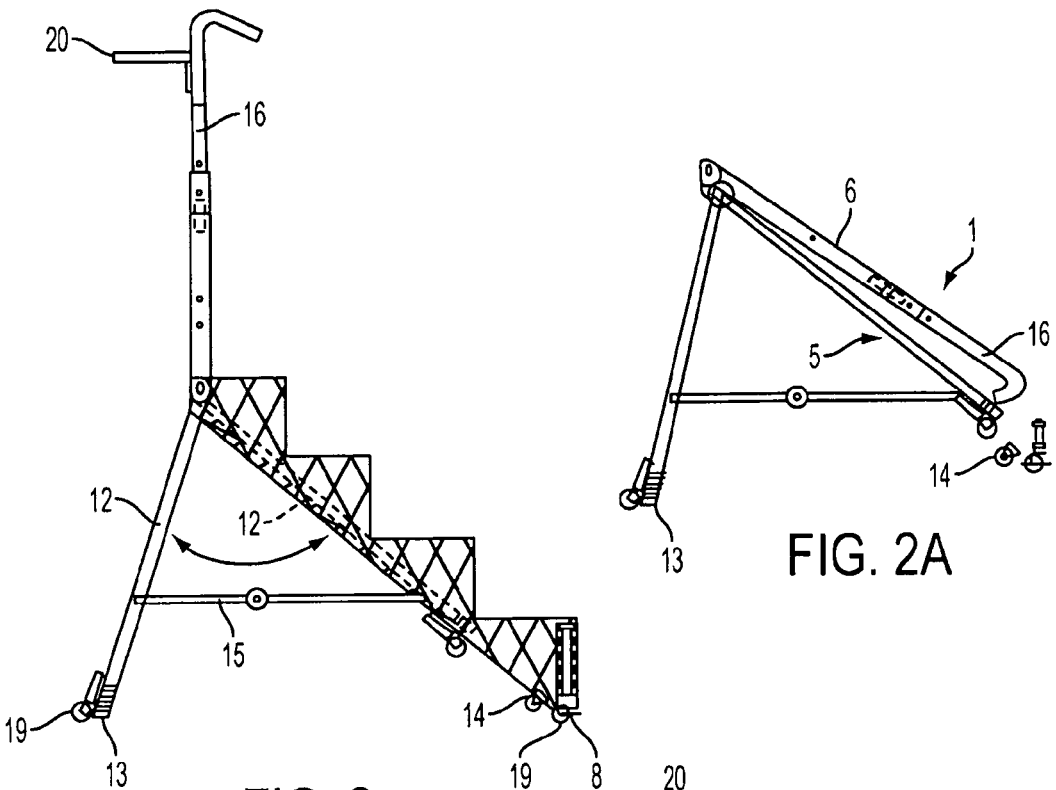
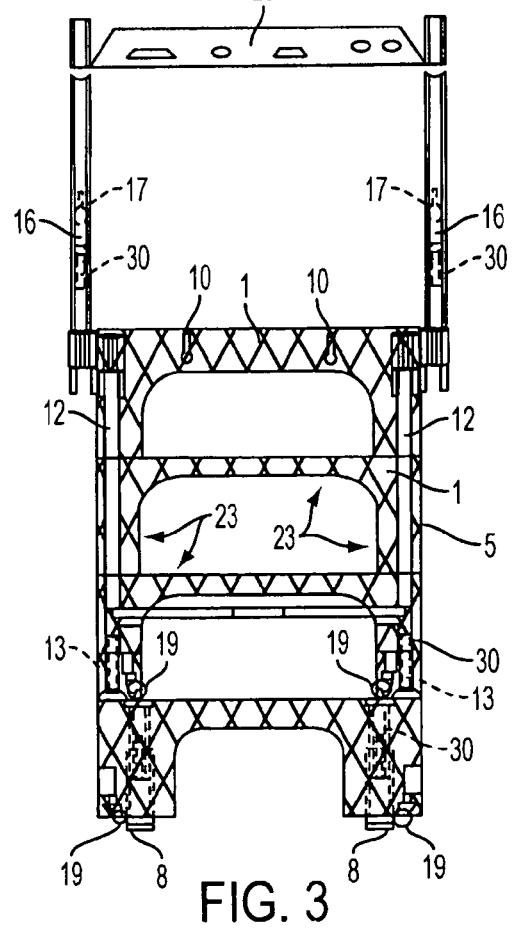
FIG. 2
FIG. 2A
FIG. 3

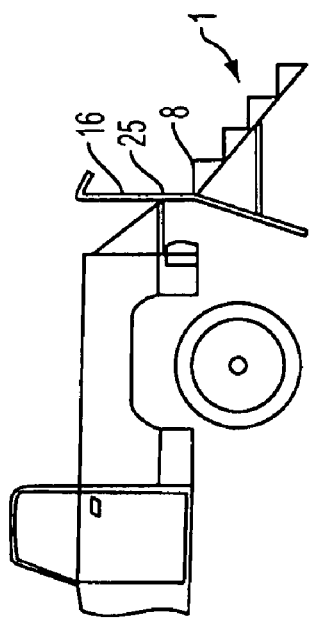
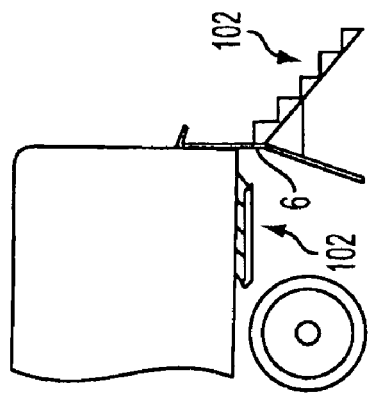
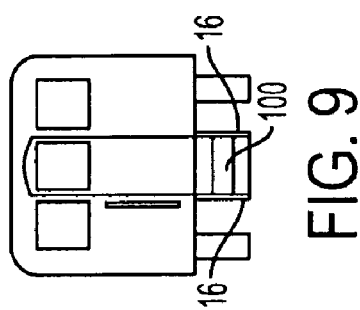
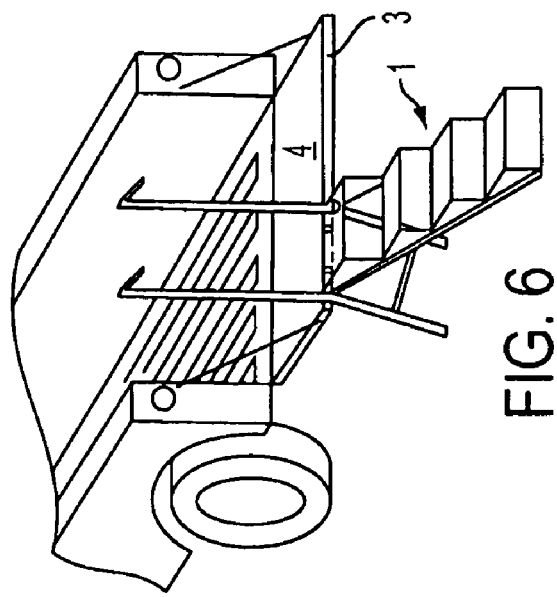
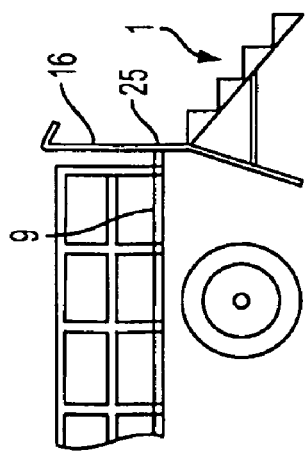

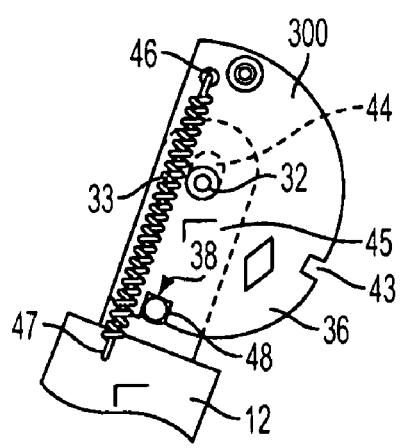
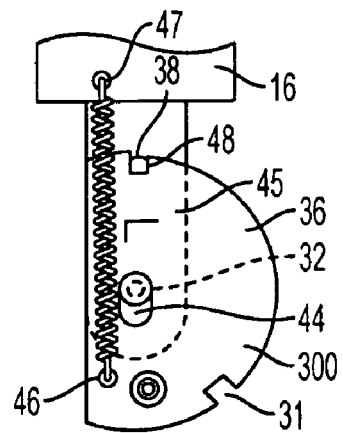
FIG. 17    FIG. 18
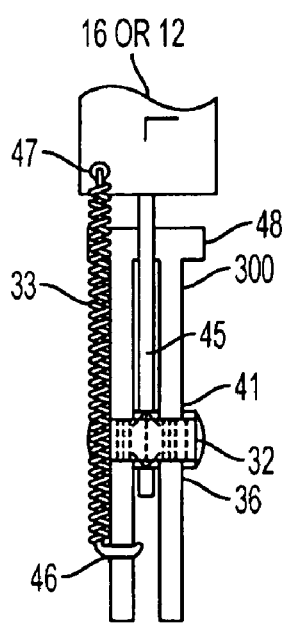
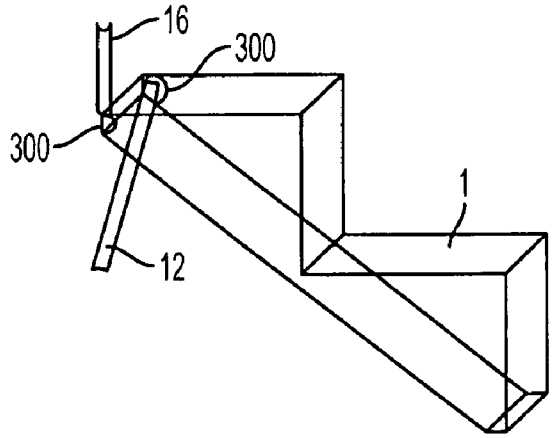
FIG. 19    FIG. 20

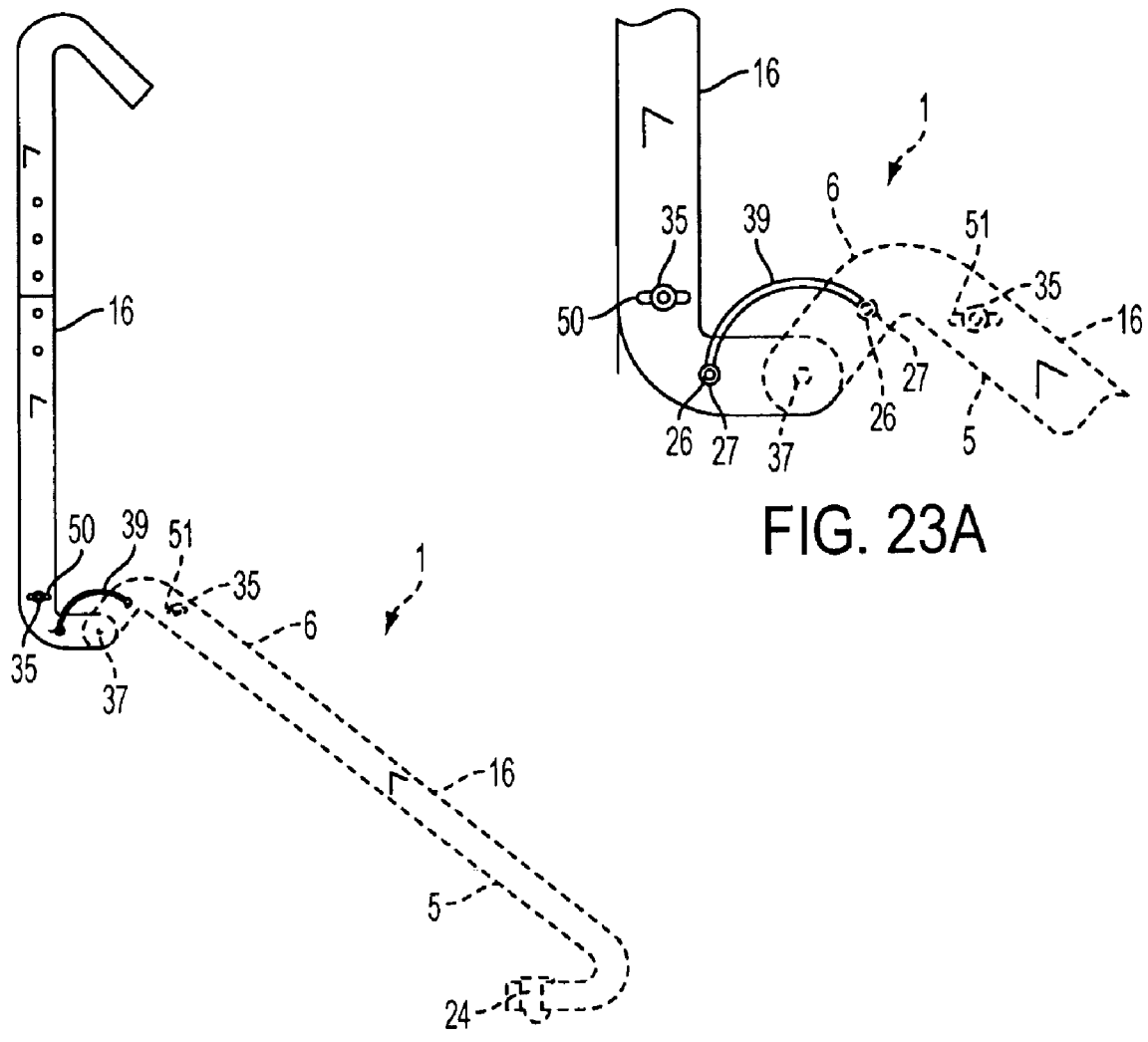
FIG. 23A
FIG. 23
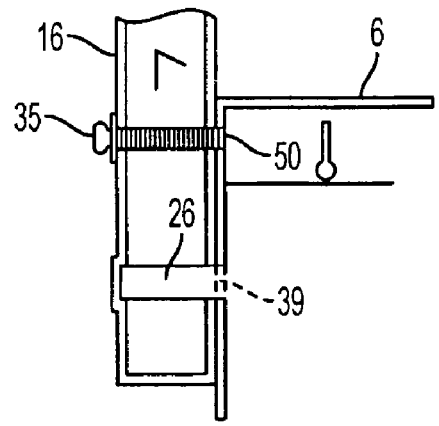
FIG. 24

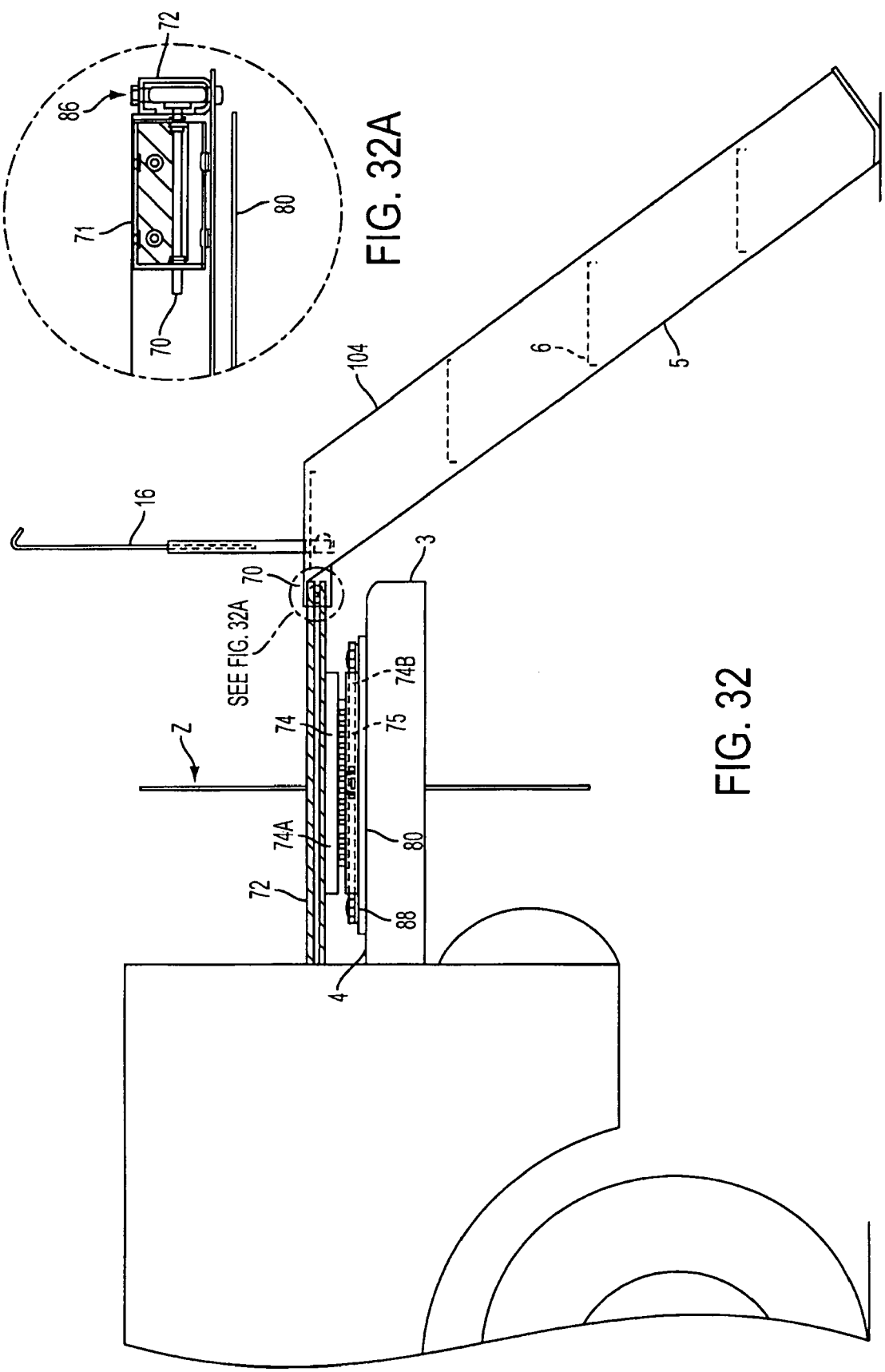

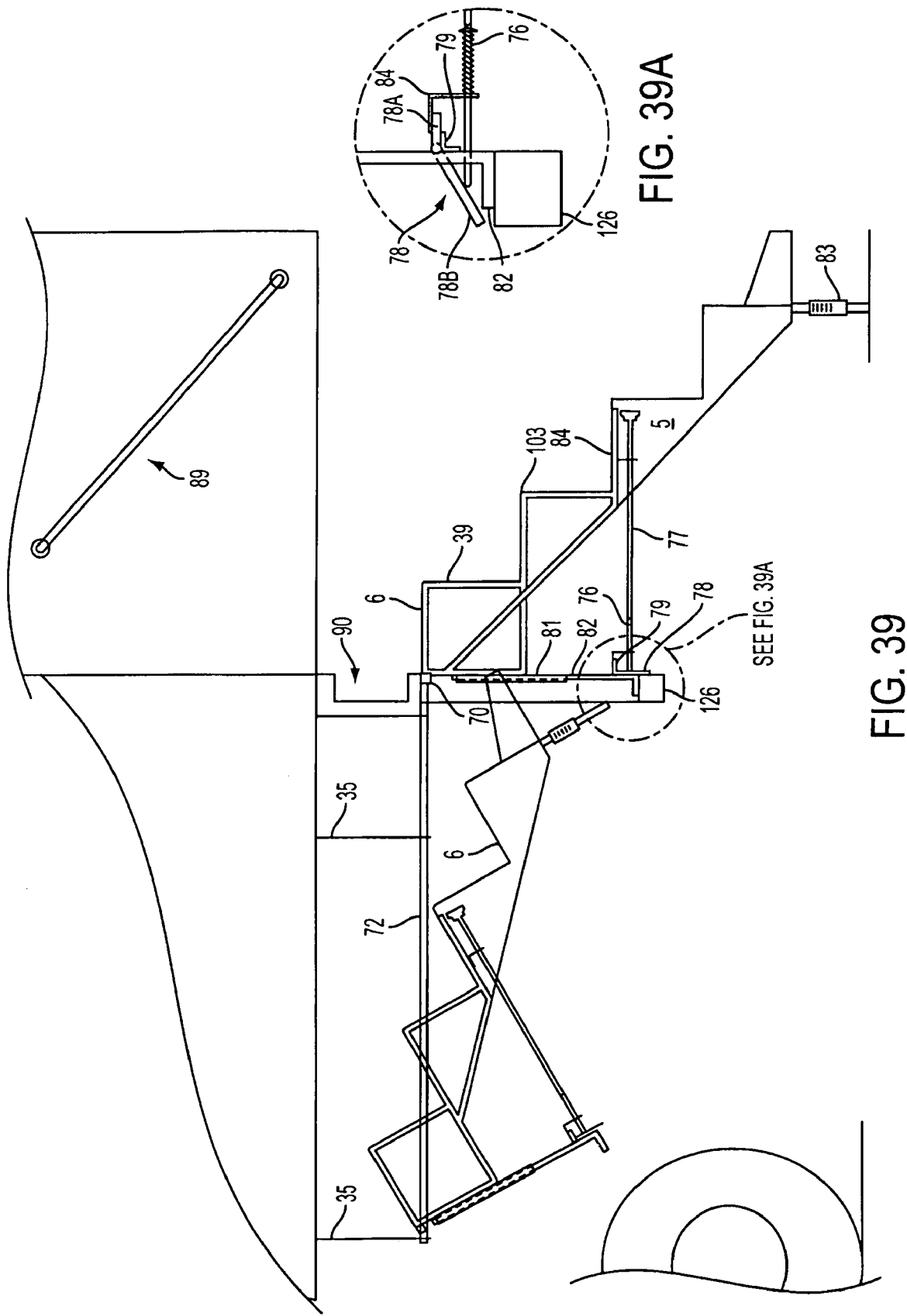

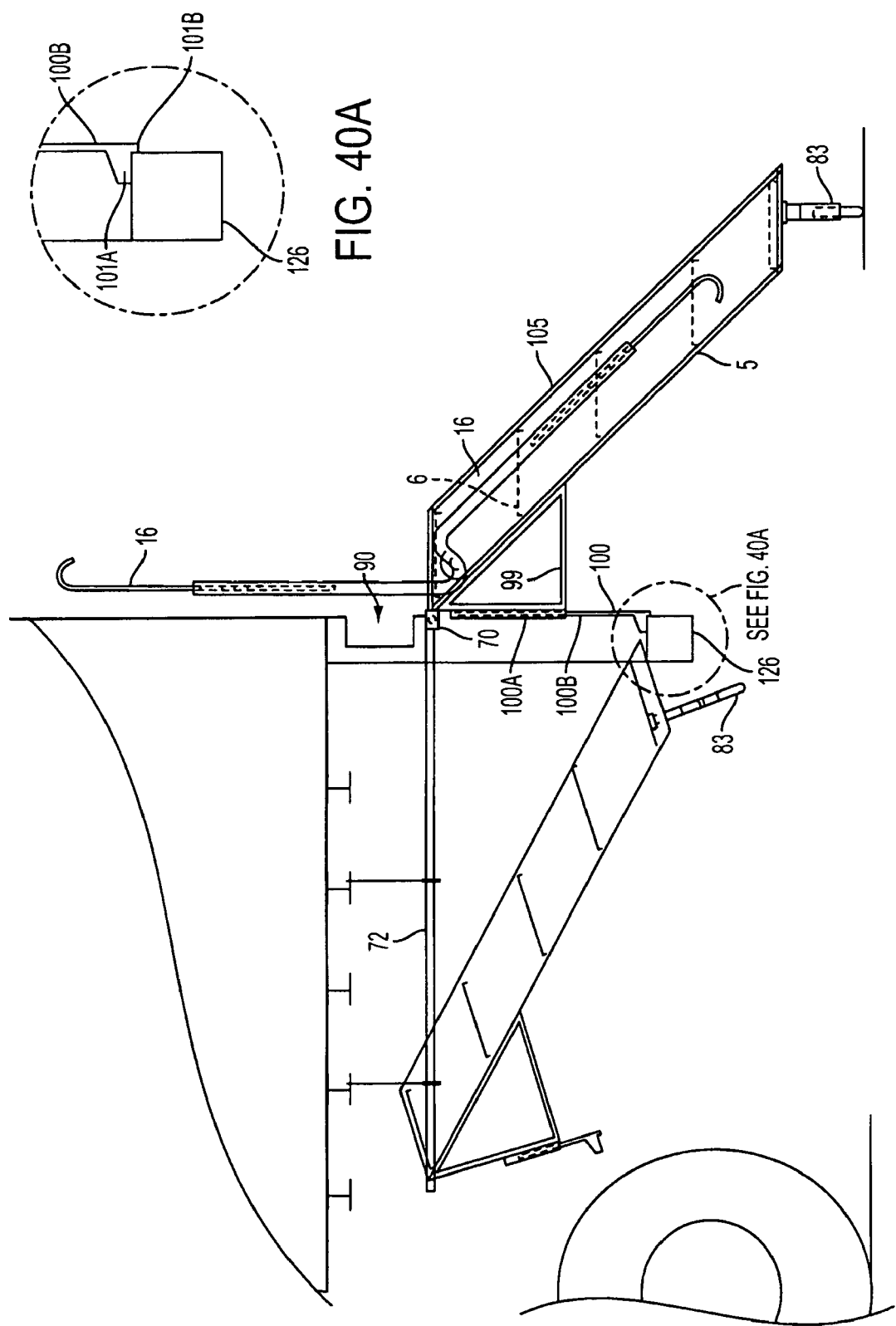

COMPACT TRUCK TAILGATE AND GENERAL PURPOSE UTILITY LADDER

CROSS-REFERENCE TO RELATED APPLICATIONS

The present application is a continuation-in-part of U.S. patent application Ser. No. 11/436,081, filed May 18, 2006 now abandoned, which is a continuation-in-part of U.S. patent application Ser. No. 11/133,353, filed May 20, 2005 now U.S. Pat. No. 7,240,947. The content of both of the foregoing applications is incorporated herein by reference.

BACKGROUND OF THE INVENTION

1. Field of the Invention

The present invention relates generally to ladders. More particularly, the present invention relates to ladders suitable for use on vehicles having a trailer, flatbed, tailgate, or the like, and/or as a general purpose free-standing ladder.

2. Related Art

Pickup tailgate-type vehicles, for example, pickup trucks, sport utility vehicles (SUV), and station wagons, in today's world have become a vehicle of choice for a variety of reasons that were not as apparent in the past. A vehicle with a tailgate was once considered a "work" type vehicle used in construction, farming, and industry.

Now there are extended cabs, four-door models with luxurious interiors and many features that were previously only found in fine automobiles. Today's SUVs, vans, station wagons, and pick-up trucks are broadly used for tailgate parties, at car races, ballgames, outdoor concerts, beach parties, and many other outdoor activities in addition to their traditional work-related uses.

Unfortunately, accessing a tailgate or flatbed of a vehicle can be quite an obstacle for many people. A major challenge is accessing the bed of the vehicle. It can be very difficult to reach over the side rails of the bed of a vehicle in order to retrieve an object, or to climb into the truck bed without the aid of a step assembly. It can be even more difficult to exit the truck bed, whether a person is carrying something or simply trying to get down, because of the height of the tailgate from the ground.

The use of step assemblies for tailgate access is known in the art. However, conventional step assemblies have various shortcomings that make them an imperfect solution to the problem of tailgate and truck bed access.

Some tailgate step assemblies are mounted permanently to a base on the inside of the tailgate, which always encumbers the tailgate. Users of such tailgate step assemblies often have to exercise additional care not to trip over the permanently mounted assembly. Others are mounted permanently to the outside of the tailgate, which exposes the ladder to damage and theft.

Most tailgates or flatbed type vehicles have a standardized distance from the ground to the tailgate or flatbed of approximately 28 inches, 30 inches, 33 inches, 37 inches, or 49 inches. Some conventional tailgate step assemblies have only a single step, which does little to bridge the height gap from tailgate to ground. Still other tailgate step assemblies have very narrow steps, or steps with large height separations, which are difficult for the elderly or disabled to use, as well as tiring for those using the assembly for an extended period of time. For example, virtually all types of ladders and staircase type assemblies in today's marketplace have a step or rung riser height of 9.5 inches to 12 inches, while typical building staircases have riser heights of around 6 to 8 inches.

Most conventional tailgate step assemblies have no support arms. In tailgate step assemblies that do have support arms, the support arms are very short. Short support, arm are essentially useless, particularly when leaving the vehicle bed. Most support arms are not permanently attached to the step assembly, which makes them very easy to forget or misplace.

Still other tailgate step assemblies have many moving parts or are collapsible, which tends to make them less stable and prone to malfunction.

Further, no conventional tailgate step assemblies are useable as free-standing step assemblies. If the user of the tailgate step assembly also needs a ladder or step assembly, for example, at a job site, the user would have to bring an extra ladder for that purpose.

The use of step assemblies for entering and exiting personnel vehicles (e.g., military transport vehicles) is also known in the art. However, conventional step assemblies have various shortcomings that may make them an imperfect solution for leaving the bed of a people-transport type vehicle. For example, military transportation vehicles generally carry a conventional movable ladder with narrow steps, and/or large height separations, which can make them difficult to climb. In addition, the movable ladder is often lost or stripped from the personnel vehicle, leaving personnel with no access to the truck bed. This may not be practical for personnel who are often carrying extra gear and equipment when entering and leaving the vehicle.

SUMMARY OF THE INVENTION

According to an exemplary embodiment, an apparatus comprises: a non-collapsible single unit stair comprising: a pair of opposing side rails supporting at least a top step and a bottom step; and a rotator unit including a lower portion secured to a substantially horizontal surface, and an upper portion mounting the non-collapsible single unit stair, wherein the lower portion and the upper portion are rotatable with respect to one another about an axis oriented substantially perpendicular to the substantially horizontal surface.

According to another exemplary embodiment, an apparatus comprises: a non-collapsible single unit stair comprising: a pair of opposing side rails supporting at least a top step and a bottom step; a roller system adapted to attach said apparatus adjacent to a substantially horizontal surface, said roller system providing for movement of the apparatus between a user-ready position and a storage position under said substantially horizontal surface; and at least one adjustable telescoping bracket extending from the non-collapsible single unit stair, said telescoping adjustable bracket adapted to contact a structure associated with the substantially horizontal surface to retain the non-collapsible single unit stair in the user-ready position.

According to yet another exemplary embodiment, an apparatus comprises: a non-collapsible single unit stair comprising: a pair of opposing side rails supporting at least a top step and a bottom step; a pair of travel rails, wherein a travel rail is associated with each of the opposing side rails of the non-collapsible single unit stair; and a ladder rack adapted to couple the apparatus to a substantially horizontal surface, the ladder rack including a pair of stationary rollers; wherein the pair of stationary rollers roll within the pair of travel rails to permit movement of the non-collapsible single unit stair between a user-ready position and a storage position.

BRIEF DESCRIPTION OF THE DRAWINGS

The foregoing and other features and advantages of the invention will be apparent from the following, more particular description of exemplary embodiments of the invention, as illustrated in the accompanying drawings, wherein like reference numbers generally indicate identical, functionally similar, and/or structurally similar elements.

FIG. 2 depicts an exemplary side view of an exemplary embodiment of a four-step version of the invention in a free-standing user-ready position, according to the present invention;

FIG. 2A depicts the ladder shown in FIG. 2, with the user-support arms in the storage position;

FIG. 3 depicts an exemplary front view of the ladder of FIG. 2;

FIG. 6 depicts an exemplary isometric view of the ladder shown in FIG. 1, secured to an outside adjacent vertical face of a tailgate in the horizontal position, by an exemplary fastening means or bolts;

FIG. 7 depicts an exemplary side view of the ladder shown in FIG. 1 coupled to a vehicle having a tailgate one step height higher than the top step of the ladder;

FIG. 8 depicts an exemplary side view of the ladder shown in FIG. 1, secured to a flatbed vehicle with fastening means provided in the user support railings;

FIG. 9 depicts an exemplary front view of a ladder secured to the furthest outside vertical section of a deck at an emergency door exit of a bus type vehicle such as a school bus;

FIG. 10 depicts an exemplary side view of an exemplary five step version of the staircase type ladder which may stand or be secured adjacent to the bed or end of an enclosed tractor trailer like vehicle, wherein the ladder is shown in the open position, and wherein the staircase type ladder is also shown in an exemplary storage position under the bed of trailer;

FIG. 17 depicts an exemplary side view of a second exemplary embodiment of a rotatable coupling attaching a support leg to the ladder;

FIG. 18 depicts an exemplary side view of a second exemplary embodiment of a rotatable coupling attaching a user-support arm to the ladder;

FIG. 19 depicts an exemplary front view of the rotatable couplings shown in FIGS. 17 and 18, which may be used for a support leg and a user-support arm, respectively;

FIG. 20 depicts an exemplary isometric view of the rotatable couplings shown in FIGS. 17 and 18, which may be used for a support leg and a user-support arm, respectively;

FIG. 23 depicts a side view of a third exemplary embodiment of a rotatable coupling used to couple a user-support arm to the side rail;

FIG. 23A is an exemplary enlarged view of the rotatable coupling shown in FIG. 23;

FIG. 24 depicts a back view of an exemplary embodiment of a rotatable coupling used to couple a user-support arm to the side rail as shown in FIGS. 23 and 23A;

FIG. 32 depicts an exemplary side view of an exemplary four-step staircase-type ladder in the user-ready position attached to a truck tailgate by a rotator unit;

FIG. 32A depicts an exemplary enlarged view of a portion of FIG. 32, showing an exemplary roller mounted inside an exemplary travel rail;

FIG. 39 depicts an exemplary side view of an exemplary staircase type ladder of the present invention which may be secured to the bed or end of an enclosed tractor trailer like vehicle, wherein the ladder is depicted in an exemplary user-ready position, and is also depicted in an exemplary storage position under the bed of the trailer;

FIG. 39A depicts an exemplary enlarged portion of the ladder of FIG. 39, showing an exemplary hinge holding plate in an exemplary raised position that allows the ladder to be moved from the user-ready position to the storage position;

FIG. 40 depicts an exemplary side view of an exemplary staircase type ladder of the present invention which may be secured to the bed or end of an enclosed tractor trailer like vehicle, wherein the ladder is depicted in an exemplary user-ready position, and is also depicted in an exemplary storage position under the bed of the trailer;

FIG. 40A depicts an exemplary enlarged portion of the ladder of FIG. 40, showing an exemplary adjustable bracket engaging a horizontal bumper bar to hold the latter in the user-ready position;

DETAILED DESCRIPTION OF EMBODIMENTS OF THE PRESENT INVENTION

An exemplary embodiment of the invention is discussed in detail below. While specific exemplary embodiments are discussed, it should be understood that this is done for illustration purposes only. A person skilled in the relevant art will recognize that other components and configurations can be used without departing from the spirit and scope of the invention.

Figure 1:
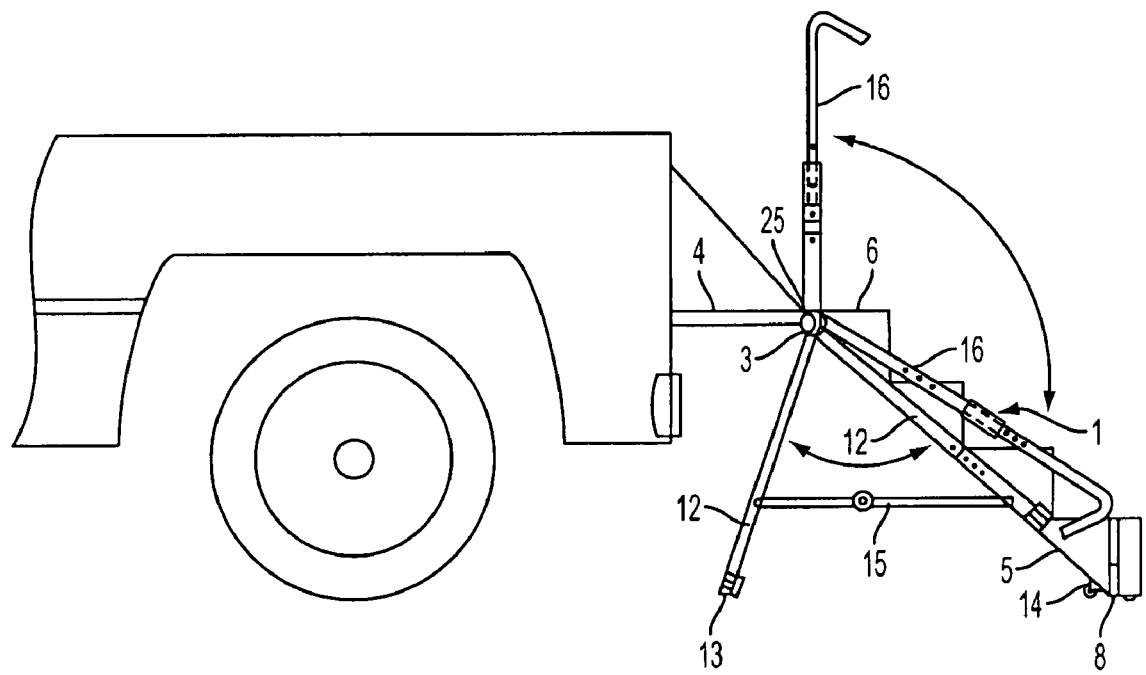
FIG. 1 depicts an exemplary side view of a four-step non-collapsible one-piece staircase type ladder in an open position and attached to a truck tailgate according to an exemplary embodiment of the present invention.

FIG. 1 depicts a side view of a first exemplary embodiment of non-collapsible staircase-type ladder 1. The ladder 1 may include a non-collapsible single unit stair that may include a pair of opposing side rails 5 supporting four steps 6. Although the side rails 5 and steps 6 are discussed as separate components, exemplary embodiments of the present invention may comprise a single unit of side rails 5 and steps 6, formed, for example, from a single molded piece of plastic, fiberglass, aluminum plate, diamond plate, or stainless steel plate, etc., forming the side rails and steps. The ladder 1 may further include a pair of support legs 12, and one or two telescoping user-support arms 16. The stability of ladder 1 may be improved with a collapsible cross-brace 15 which may be coupled to side rail 5 and support leg 12.

The ladder 1 may be coupled to the outermost edge 3 of an open truck tailgate 4. The coupling mechanism may include, for example, tailgate-to-ladder fastening bolts 25 that may protrude from edge 3 of the tailgate 4. See FIGS. 4 and 5 below. Slots (not shown in FIG. 1, but see slots 17, 10 described further below with reference to FIGS. 3 and 6, respectively) may be provided in, e.g., the user-support arms 16, or in the back of the top step 6, that may be operative to slide over the fastening bolts 25 and secure the ladder 1 to the tailgate edge 3. In this first embodiment, when the tailgate 4 is secured to slots in the back of the top step of the ladder 1, the top step may be at the same elevation as the open tailgate 4. The fastening bolts 25 may move freely up and down while positioned in the slots, while the ladder 1 may stay immobile on the ground. Coupling the ladder 1 to the edge 3 of a tailgate 4 may leave the horizontal surface of the tailgate 4 unencumbered for access of people or materials. The user-support arm 16 and support leg 12 are also shown in a storage position on the outside of side rail 5, for reference.

When ladder 1 is in the access user ready position, as shown in FIG. 1, the slots may be centered at the same center as fastening bolts 25 when tailgate 4 is in the open horizontal position. In an exemplary embodiment, to achieve this alignment, for example, on uneven ground, the ends of the support legs 12 may be equipped with adjustable telescopic feet 13, and the inside face of the side rails 5 or the inside front face of the bottom step 6 may be equipped with adjustable telescopic feet 8. In an exemplary embodiment, the casters 14 may be installed on an outside bottom surface of the side rails 5 to allow the ladder 1 to be rolled about in a closed position.

FIG. 2 depicts an exemplary side view of ladder 1 in a free-standing, user-ready position, with telescoping user-support arms 16 fully extended, according to an exemplary embodiment. A utility tray 20 may be coupled to the upper ends of user-support arms 16 and ready for use. Height-adjustable feet 8 and 13 together may permit ladder 1 to be leveled when open on an uneven surface. In addition, in an exemplary embodiment, spring-actuated casters 19 may be coupled to the lower ends of support legs 12 or on the inside face of side rails 5, or on the inside front face of bottom step 6. In an exemplary embodiment, casters 19 may permit the operator to roll ladder 1 from one area to another without having to open and close ladder 1. This feature may be useful for trades people using the ladder in areas where the ladder may roll easily on the floor. The feature also makes it possible to move the ladder with any tools and supplies in use aboard the ladder without having to fold and carry the ladder and find another means for moving the tools and supplies. Support leg 12 is also shown in a storage position underneath steps 6.

FIG. 2A depicts an exemplary side view of ladder 1 in a free-standing, user-ready position, with user-support arms 16 in a storage position, where they can be mounted to an outside face of the side rails 5, which permits use of the ladder without the user-support arms 16. Support leg 12 is also shown in a storage position against the outside of side rail 5.

FIG. 3 depicts a front view of ladder 1. Ladder 1 may provide a large opening 23 in the stair risers, which may allow the user's entire foot, or both feet, to be on one step 6. In an exemplary embodiment, each step may be about fifteen inches wide and may be about 9 inches deep. In an exemplary embodiment, each step may be vertically separated from an adjacent step by about seven to eight inches. In an exemplary embodiment, height-adjustable feet 13 may be attached to support leg 12 by matching up holes in leg 12 with holes on an insert piece on height-adjustable foot 13. Feet 8 may be adjusted by matching up holes in a foot 8 with holes on an insert piece, and by the insertion of a dimpled locking spring device 30. The insert piece may be on the inside face of the bottom step 6 or on the inside face of side rails 5. Foot 8 may be adjusted and secured at a desired position. The height of user-support arm 16 may be adjusted in a similar manner, or by any other securable, adjustable means. Slots 10 are indicated where they may be positioned, e.g., in the back of the top step 6. Slots 17 are shown in the back of user-support arms 16, although slots 17 may not be visible from the front of ladder 1. The use of slots 10 or slots 17 depends on the alignment of the tailgate or flatbed with the ladder. For example, if the tailgate or flat bed is higher than the top step 6, then slots 17 are used. If the tailgate or flatbed is at the same height as the top step 6, then slots 10 are used.

Figure 4:
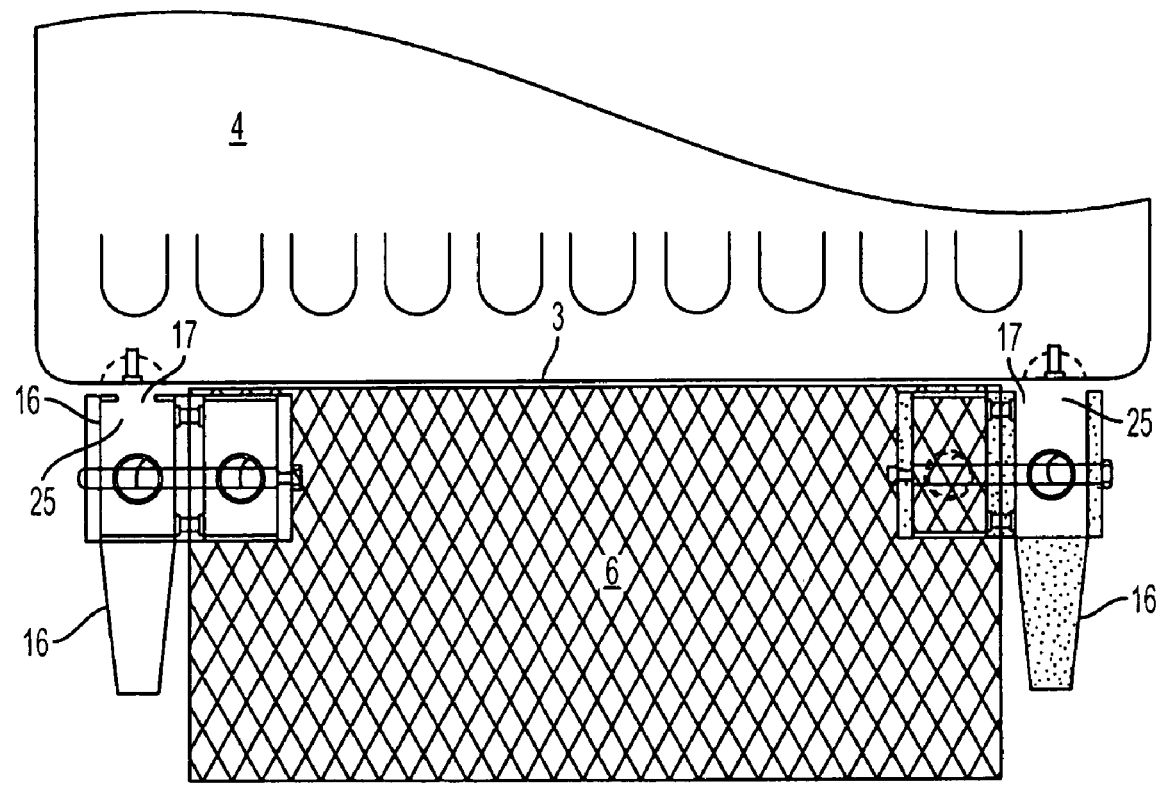
FIG. 4 depicts an exemplary top view of an exemplary top step of an embodiment of the present invention where the ladder attaches to the tailgate from slots provided in the user-support arms.

FIG. 4 depicts an exemplary top view of a top step of an exemplary embodiment of the present invention where the ladder may be attached to the tailgate from the user-support arms 16. The ladder 1 may be coupled to the vertical face 3 of tailgate 4 for example, by sliding slots 17, disposed in user-support arms 16, over tailgate-to-ladder fastening bolts 25 protruding from the vertical face 3 of open tailgate 4, or of a vehicle flatbed.

Figure 5:
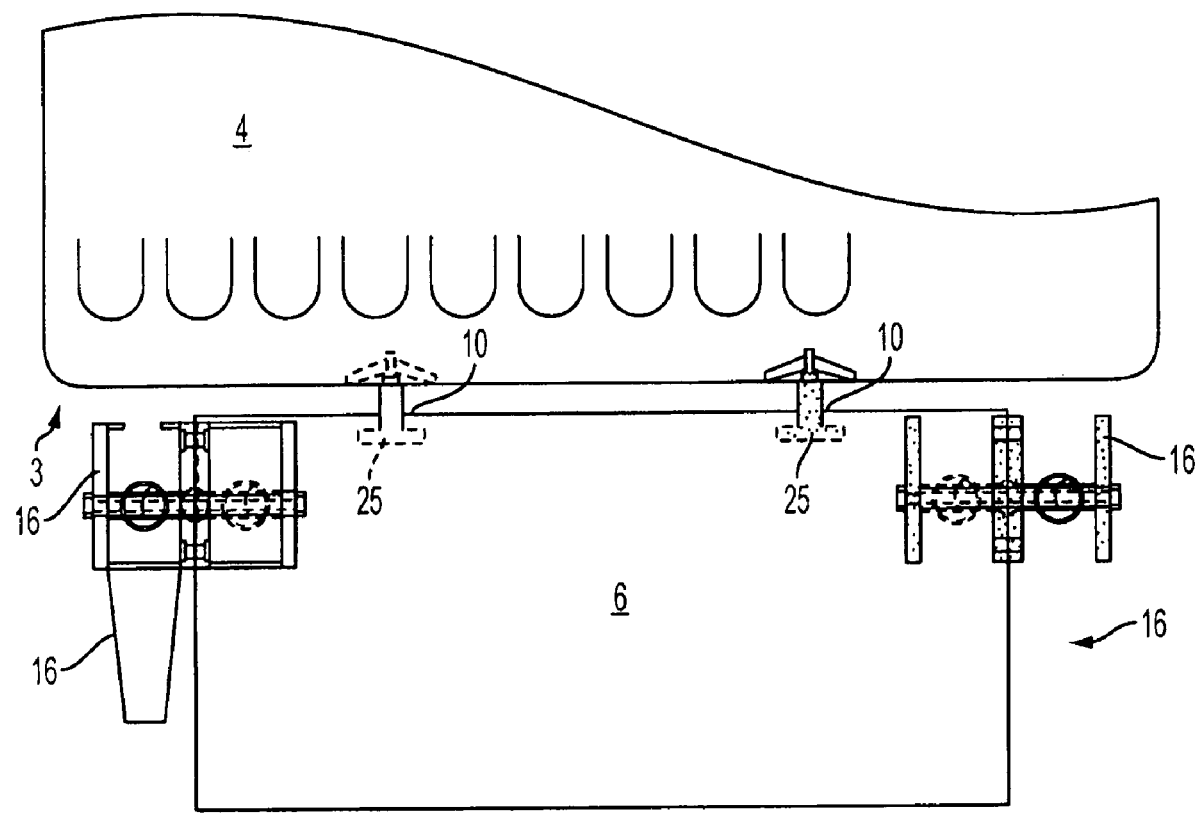
FIG. 5 depicts an exemplary top view of a top step of an embodiment of the present invention where the ladder attaches to the tailgate from slots provided in the vertical backdrop behind the top step.

FIG. 5 depicts an exemplary top view of a top step of an embodiment of the present invention where the ladder may attach to the vertical face 3 of the open tailgate from the vertical backdrop behind the top step 6. Slots 10 may be disposed in the back of the top step that may be adapted to slide over fastening bolts 25.

FIG. 6 depicts an isometric view of the ladder shown in FIG. 1, secured to an outside face 3 of a tailgate 4 in the horizontal position, by fastening means which may be provided in the vertical back drop behind the top step 6. Fastening the ladder 1 to the tailgate 4 at the top step may allow the top step to be substantially level with the horizontal tailgate.

FIG. 7 depicts a side view of the ladder coupled to a tailgate, with fastening means provided in the user-support arms 16, where the tailgate is higher than the top step of the ladder.

FIG. 8 depicts a side view of the ladder secured to an exemplary flatbed trailer 9 with fastening means provided in the user-support arms 16. The fastening means may be, for example, bolts or other means described in relation to FIG. 4, or any of various conventional couplers, fasteners, or connectors. When the ladder is fastened by the user-support arms 16, the top step of the ladder may be positioned one step-height below the flatbed or tailgate height.

FIG. 9 depicts an exemplary front view of a ladder 100 secured to the furthest outside vertical section of the deck at the emergency door exit of a school bus type vehicle. The user-support arms 16 are shown stowed in a storage position.

FIG. 10 depicts an exemplary side view of an exemplary five-step embodiment 102 of the staircase type ladder in an open position which may be secured or standing adjacent to the bed of an enclosed tractor trailer like vehicle. Also shown is the staircase type ladder 102 in a storage position under the bed of the trailer.

Figure 11:
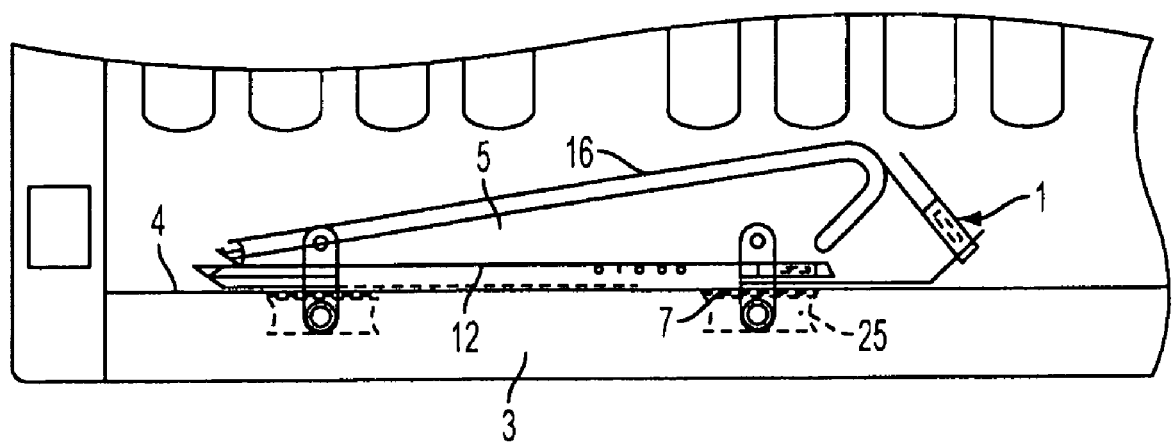
FIG. 11 depicts an exemplary top view of an exemplary embodiment of the present invention mounted to the inside of a closed truck tailgate in an exemplary concealed storage position.
Figure 12:
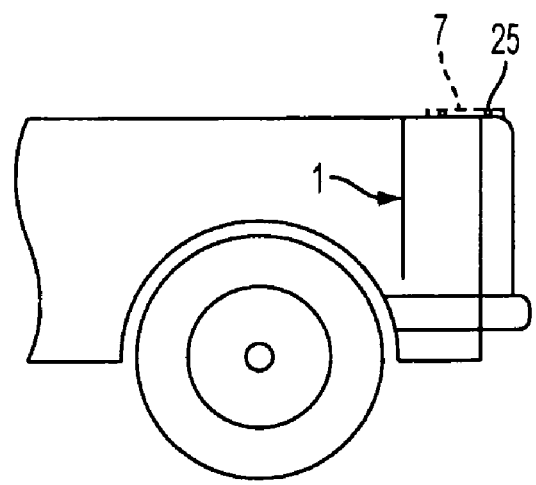
FIG. 12 depicts an exemplary side view of the stored ladder shown in FIG. 11.

FIG. 11 depicts a top view of ladder 1 which may be mounted to the inside of a closed truck tailgate in the concealed storage position. User-support arm 16 and support leg 12 are shown in a storage position on the outside face of side rail 5. FIG. 12 depicts an exemplary side view of the stored ladder shown in FIG. 11. The folded ladder assembly may be mounted, for example, by means of retractable storage brackets 7 coupled to the outer face 3 of tailgate 4 via fastening bolts 25.

Figure 13:
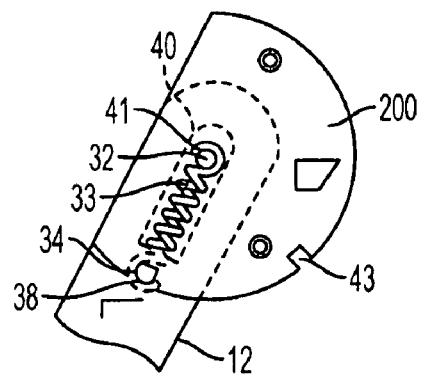
FIG. 13 depicts an exemplary side view of a first exemplary embodiment of a rotatable coupling which may attach a support leg to the ladder.
Figure 14:
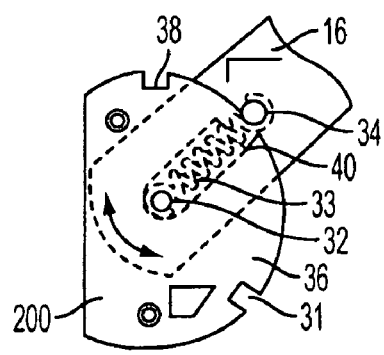
FIG. 14 depicts an exemplary side view of a first exemplary embodiment of a rotatable coupling which may attach a user-support arm to the ladder.
Figure 15:
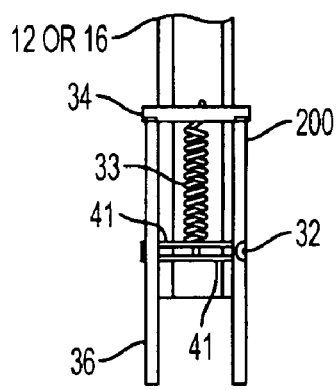
FIG. 15 depicts an exemplary front view of the rotatable couplings shown in FIGS. 13 and 14.

FIGS. 13-15 show various exemplary views of a first exemplary embodiment of a rotatable coupling 200 that may be used to couple support leg 12 or user-support arm 16 to an exemplary ladder according to embodiments of the present invention. Hereinafter, the coupling may be described as being attached to support leg 12, however, the coupling may be coupled analogously to user-support arm 16, as shown, for example, in FIG. 14.

Support leg 12 may be mounted in between rotor limiting plates 36. Each rotor limiting plate 36 may have at least two slots disposed in its outer edge: a storage slot 31, 43, and a user-ready slot 38. The couplings shown in FIGS. 13 and 14 are substantially similar, however, the separation and angle between the user-ready slot and storage slot in a support leg coupling may be different from the separation and angle in a user-support arm coupling. Although only two slots are described in detail below, any number of slots could be provided in the rotor limiting plates 36 to allow more flexibility in positioning the support legs 12 and the user-support arms 16. Rotor limiting plates 36 may be substantially semi-circular, or circular less a sector as illustrated, but are not limited to that shape.

A separation sleeve 41 may be placed between rotor limiting plates 36 and over a securing bolt 32. Separation sleeve 41 may be long enough to permit rotation of support leg 12 about separation sleeve 41. Support leg 12 may have a locking pin 34 mounted inside a hollow stanchion of support leg 12 that may penetrate the walls of support leg 12. Locking pin 34 may protrude from the outside face of support leg 12 for a length approximately equal to the thickness of the rotor limiting plate 36.

One end of a spring 33 may be coupled to locking pin 34, while the opposite end of spring 33 may be coupled to separation sleeve 41 in between rotor limiting plates 36. Spring 33 may be generally stretched and under tension at all times, resulting in locking pin 34 being held against the bottom of one of the user-ready or storage slots, as seen, e.g., in FIG. 13, or may be held against the outer edge of rotor limiting plates 36, as seen, e.g., in FIG. 14.

When locking pin 34 is in a slot, e.g., slot 38, a gap may be created between the bottom of contoured spring slot 40, and the bottom of separation sleeve 41. This gap may be approximately equal to the diameter of stationary locking pin 34. When the user desires to move support leg 12, or user-support arm 16, from one position to another, support leg 12 may be pulled such that locking pin 34 comes out of the slot where it rests. While locking pin 34 is out of its current slot, support leg 12 may be rotated to another slot while locking pin 34 slides along the outer edge of rotor-limiting plates 36. Pulling support leg 12 to remove locking pin 34 from a slot temporarily closes the gap.

Figure 16:
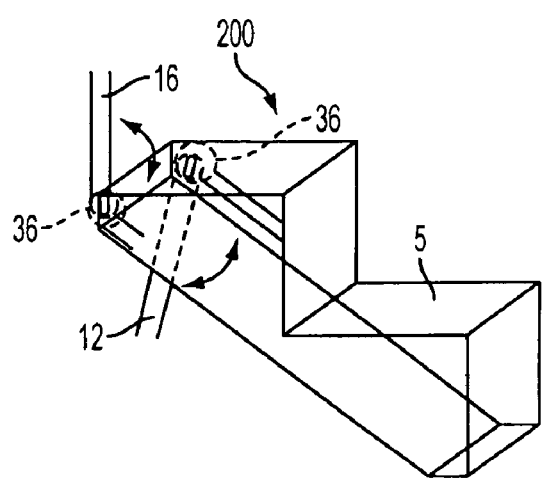
FIG. 16 depicts an exemplary isometric view of the rotatable couplings shown in FIGS. 13 and 14 which may be used for a support leg and a user-support arm, respectively.

FIG. 16 is described further below following FIG. 19.

FIGS. 17-19 show various exemplary views of second exemplary embodiment of a rotatable coupling 300 that may be used to couple support leg 12 or user-support arm 16 to an exemplary ladder according to embodiments of the present invention. Hereinafter, the coupling is described as being attached to support leg 12, however, the coupling 300 may be coupled analogously to user-support arm 16, as shown, for example, in FIG. 18.

Support leg 12 may be coupled to a rotary plate 45 secured in between rotor limiting plates 36. A spring 33 may be secured at one end to support leg 12, for example, in a hole 47. The other end of spring 33 may be secured to rotor limiting plate 36, for example, in a hole 46. A configured slot 44 in rotary plate 45 may provide a gap between the bottom of the separation sleeve 41 and the bottom of the configured slot 44 approximately equal to the diameter of locking pin 48. This gap may permit locking pin 48 to move to the outside edge of rotor limiting plates 36 when more pressure is applied to spring 33, e.g., when support leg 12 is pulled on in the direction of the line of spring 33.

FIG. 16 shows an isometric view of part of an exemplary embodiment of the present invention, with user-support arm 16 secured to an outside face side rail 5 with rotatable coupling 200. Further, support leg 12 is shown secured to the inside face of side rail 5 with rotatable coupling 200. Support legs 12 may also be secured to the outside face of side rails 5 at a point just below user-support arms 16. User-support arm 16 and support leg 12 may be rotated from a user ready slot to a storage position slot or vice versa. Either of the embodiments shown in FIGS. 13-15 or FIGS. 17-19 may be used to couple support legs 12 or user-support arms 16 to the ladder 1. Additionally, other coupling mechanisms may also be used. FIG. 20 is analogous to FIG. 16, but for rotatable coupling 300.

Figure 21:
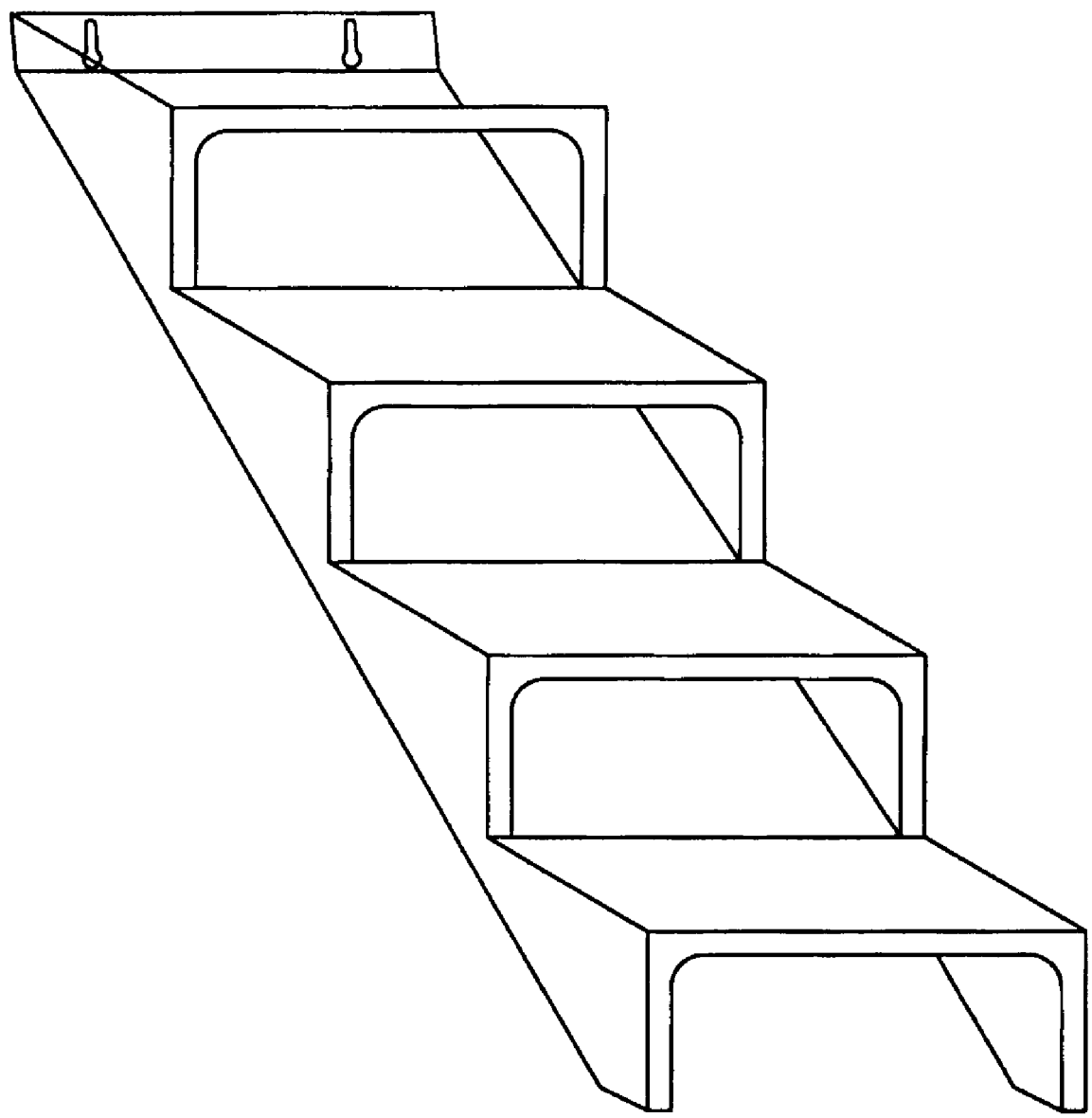
FIG. 21 depicts an isometric view of a one-piece solid ladder without attachments.

FIG. 21 shows an isometric view of a one-piece non-collapsible single-unit stair, without any additional components. The stair may be made in a mesh style, or solid. The stair may be made from, e.g., aluminum, diamond plate, stainless steel, fiberglass, nylon or plastic, formed or stamped from a one piece configuration. The steps of the stair may be perforated to prevent liquids from pooling on the steps. The steps may also have a non-skid surface.

Figure 22:
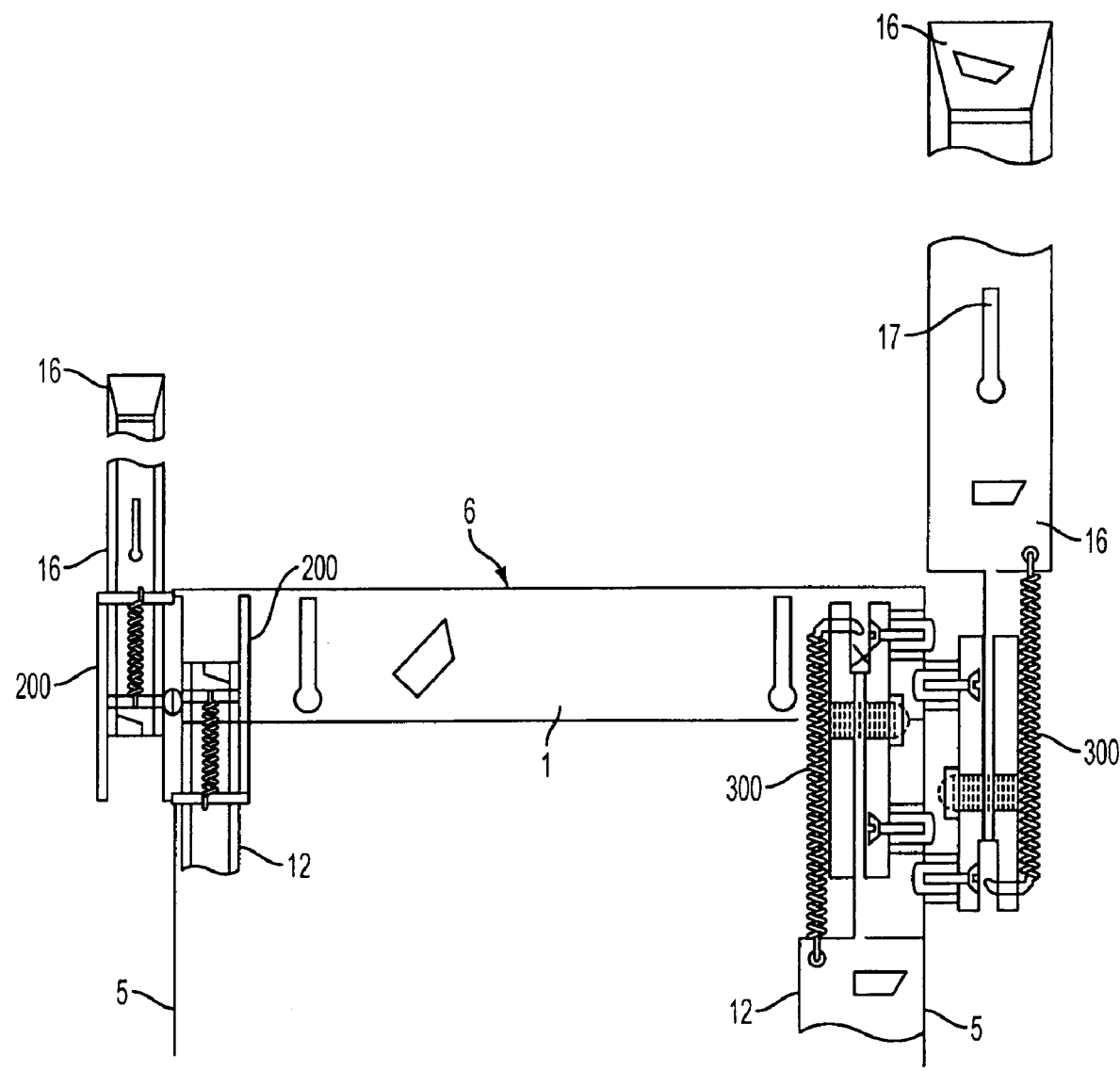
FIG. 22 depicts a rear view of an exemplary top step of the invention showing exemplary rotatable couplings.

FIG. 22 depicts a rear view showing the back side of the top step 6. The rotatable couplings 200 and 300, respectively, on the user-support arms 16 are shown coupled to the outside face of the side rails 5, while the rotatable couplings 200 and 300 for the support legs 12 may be coupled to the inside face of side rails 5. The rotatable couplings for the support leg 12 may be coupled in the alternative to the outside face of side rails 5.

FIG. 23 depicts a side view of a third exemplary embodiment of a rotatable coupling used to couple a user-support arm 16 to the side rail 5. FIG. 23A is an enlarged view of the rotatable coupling shown in FIG. 23. FIGS. 23 and 23A show the user-support arm in the user ready and storage positions. The user-support arm 16 is pulled against the outside face of side rail 5 by a rotation rivet 37 that holds user-support arm 16 and side rail 5 together. User-support arm 16 may also be held in position with a rivet 26, whose shaft may pass through user-support arm 16 and curved slot 39. Slot 39 may be wide enough to permit penetration of the shaft of rivet 26. Rivet 26 may be disposed in a hole 27 in user-support arm 16. The shaft of rivet 26 may be long enough to extend from the outside face of user-support arm 16 to the inside face of slot 39 in side rail 5. The disposition of rivet 26 in slot 39 may permit the rotation of user-support arm 16 between a user-ready and a storage position. User-support arm 16 may be secured in position to side rail 5 by a thumbscrew 35 through a hole 50 (user ready position) or hole 51 (storage position), both in side rail 5. When in the storage position, user-support arm 16 may be further secured with a holding bracket 24 coupled to side rail 5.

FIG. 24 depicts a back view of the user-support arm 16 in a user ready position and secured to the outside face of side rail 5. Hole 50 in side rail 5 receives thumbscrew 35 to secure user-support arm 16. The shaft of rivet 26 fits within slot 39, and is held in slot 39 by the ends of the rivet 26.

Figure 25:
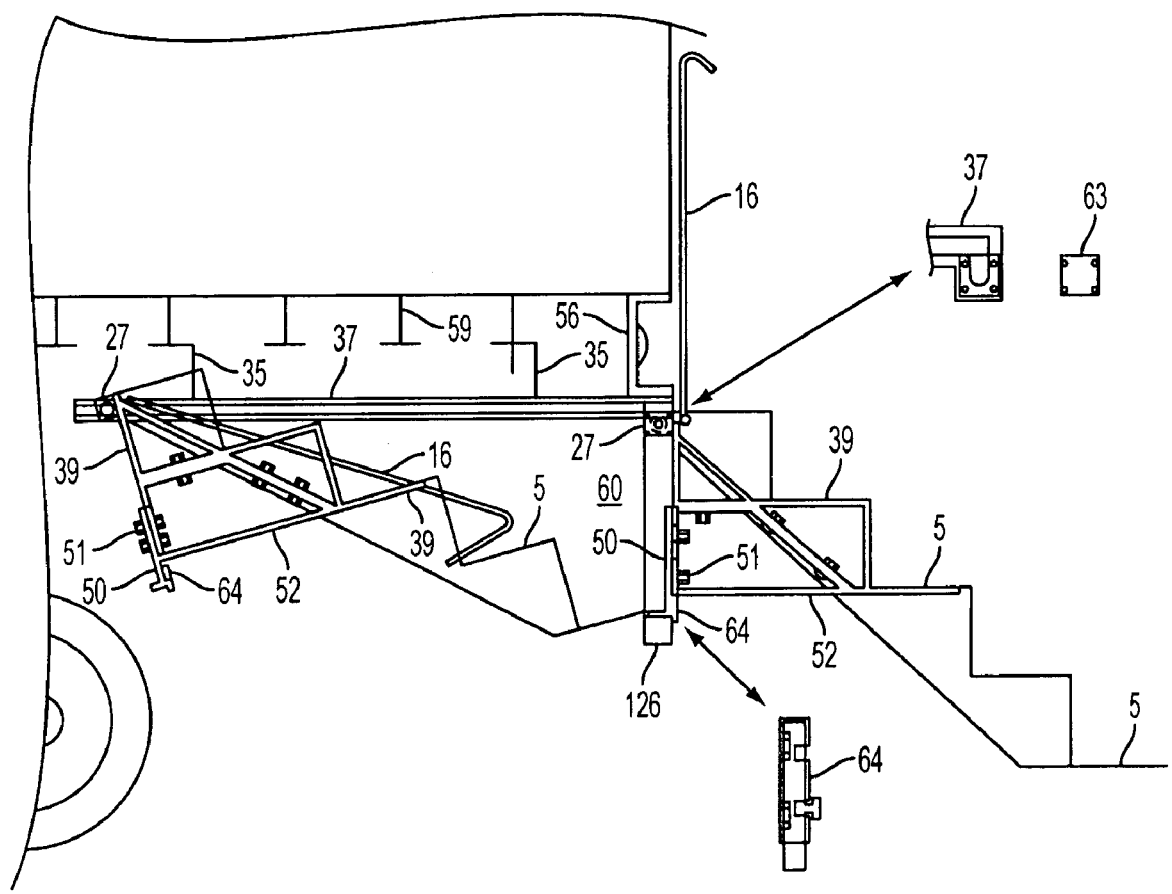
FIG. 25 depicts an exemplary side view of an exemplary staircase type ladder of the present invention which may be secured to the bed or end of an enclosed tractor trailer like vehicle, wherein the ladder is depicted in a user-ready position, and is also depicted in an exemplary storage position under the bed of the trailer.

Referring to FIG. 25, another exemplary embodiment of a ladder 5 according to the present invention is shown. FIG. 25 is a side view of a five step version of ladder 5 shown in the user-ready position as well as in the storage position. In the exemplary embodiment shown, the top step of ladder 5 is one step below the deck of the trailer.

When ladder 5 is in the user ready position, it can be held there by an adjustable bumper bracket 50 that can be secured to a first ladder bracket 39 and/or a secondary, non-collapsible ladder bracket 52. According to one exemplary embodiment, the unit comes with the optional secondary bumper bracket 52 attached, although it can easily be removed if the trailer horizontal bumper bar is too high to permit its use.

The secondary, non-collapsible ladder bracket 52 may be necessary when the horizontal trailer bumper bracket 126 is approximately 21 inches above ground level. Vertical sections of the ladder brackets 39, 52 may be constructed of hollow tubing (e.g., rectangular or square hollow tubing) so that bumper bracket 50 can be located inside the tubing and moved up or down for proper vertical alignment.

Ladder 5 can be held in place by one or more rollers 27 that allow ladder 5 to move freely from an open user-ready position to a storage position under trailer, both of which are shown. Rollers 27 can be mounted over a rod 60 that snugly passes through side rails located behind ladder 5. The rollers 27 can rest between ladder roller tracks 37 that are mounted under truck bed framing 59, for example, by one or more adjustable hangers 35 that are welded or bolted to the truck bed framing 59. Hanger(s) 35 can be designed to be adjustable in position and/or to conform to the truck bed framing 59. Replaceable ladder rollers 27 may be permanently mounted in between roller rails 37. Threaded rod can be attached to each hanger 35 to allow roller rails 37 to be adjusted vertically to allow for exact vertical location of the horizontal position of the ladder's steps. One of ordinary skill in the art will know that the rollers 27, roller rails 37, rail hanger(s) 35, and related components may be of a different style or type than what is shown.

Once ladder 5 steps have been set at the desired vertical position when in the user-ready position, the bottom horizontal section of adjustable bumper bracket 50 can be positioned to rest firmly against the top horizontal section of horizontal bumper rail 126, and then secured to non-collapsible secondary ladder bracket 52, for example, using bolts. A slide pin 64 can be mounted to the outside vertical face of the adjustable bumper bracket 50. Slide pin 64 can be extended downward to the point where it will rest against outside vertical face portion of the horizontal bumper rail 126, and hold ladder 5 in the user ready position. Since the horizontal bumper rail 126 may be located at different heights depending on the vehicle, adjustable bumper bracket 50 can be adjusted vertically to suit various locations.

When ladder 5 is in the user-ready position, rollers 27 can drop into a substantially vertical slot defined in rails 37. Engagement between the rollers 27 and the slot can retain the ladder 5 in the user-ready position. The length of the vertical slot can be substantially equal to the vertical length of the portion of the pin in slide bolt 64 that protrudes over and rests against the outside vertical face of bumper rail 126. As a result, to place ladder 5 back into the storage position, the user can first raise rollers 27 upwards out of the vertical slot and into the horizontal track portion of rails 37. From this point, the user can push ladder 5 straight back until the top step clears the lower horizontal surface of angle iron 56, at which point, the ladder 5 can be raised by lifting up on the bottom step and pushing ladder 5 back into the desired storage position. According to this exemplary embodiment, it may not be necessary to cut a clearance into channel iron 56 for ladder 5. According to an alternative embodiment, the vertical slots can be omitted from the rails 37, for example, by providing a cut-out in channel iron 56 that is large enough to allow the top step of ladder 5 to slide back under the trailer when ladder 5 has been raised enough for the pin that has been left in the open position in slide bolt 64 to clear the top horizontal section of horizontal bumper 126. This embodiment may be preferable if the user does not want to raise and lower the pin in slide bolt 64 every time he uses the ladder 5. In the case where rails 37 come pre-formed with the vertical slot, the vertical slot can be blocked with an optional plate 63 (e.g., bolted or riveted to the rails 37) if the user wants to engage and disengage the pin in slide bolt 64 every time he uses the ladder 5.

When not in use, ladder 5 may be rolled back under the trailer with its bottom step resting on the horizontal bumper rail 126, or alternatively, attached to the other end of the roller rails or the trailer framing with S-hooks or similar devices. The user support railings 16 can be attached to the side rails of ladder 5 when it is in the storage position.

Figure 26:
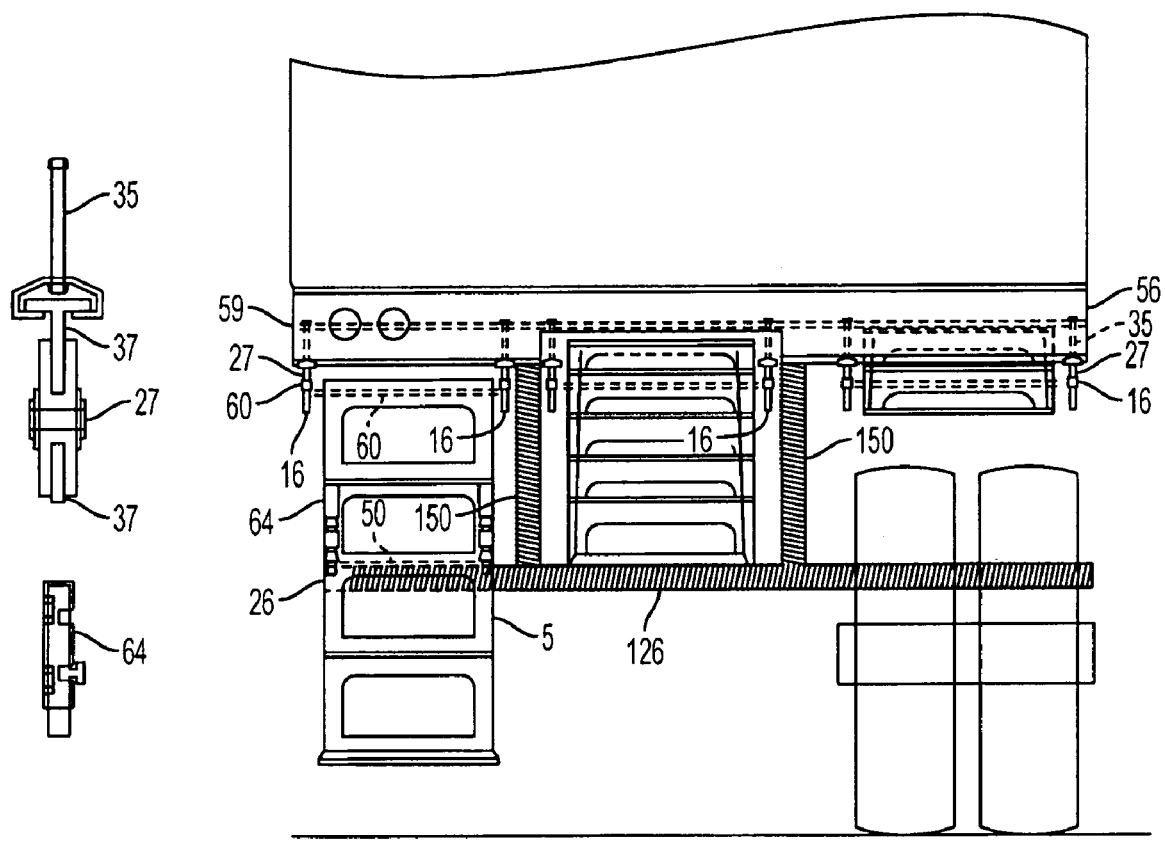
FIG. 26 depicts an exemplary rear view of an exemplary staircase type ladder in an open position (left) secured adjacent to the bed or end of an enclosed tractor trailer like vehicle, and also depicts the staircase type ladder in two different closed positions (center, right) under the bed of the trailer.

FIG. 26 is a front view of the five step ladder of FIG. 25 located behind a trailer. On the left side of the figure, the ladder is located in the user-ready position, with rollers 27 secured in ladder roller slots between roller rails 37 and attached to hangers 35 secured to trailer framing 59. The ladder 5 can be held firmly in the user-ready position by the adjustable bumper bracket 50, which can be raised or lowered to compensate for the vertical height of the horizontal bumper rail 126. The bottom horizontal surface of the bumper bracket 50 can be mounted tightly against the upper surface of horizontal bumper rail 126 after being set at the proper elevation, for example, using bolts or other fasteners. The bumper bracket 50 can be attached to the ladder 5 via the first ladder bracket 39, and/or second ladder bracket 52, for example, by bolts, rivets, or other fasteners. The lower horizontal surface of bumper bracket 50 can rest firmly against the upper horizontal section of trailer bumper rail 126. Slide bolts 64 may be installed on the bottom vertical section of adjustable bumper bracket 50 in such a position that when the slide bolts are released, they will rest firmly against the outside vertical section of bumper rail 126, and hold ladder firmly in the user-ready position.

Still referring to FIG. 26, ladder 5 is shown in the center of the figure in a storage position under the truck bed. Ladder 5 is located between two vertical stanchions 150 that support the horizontal bumper rail 126. In the exemplary position shown, the bottom of ladder 5 is resting on top of horizontal bumper rail 126. If the user wants to maximize the height of the top step of ladder 5, he may block out the vertical slots in the roller tracks 37 (shown in FIG. 25), for example, by installing the plate 63 (shown in FIG. 25 and discussed in connection therewith). According to an exemplary embodiment, holes may be predrilled into roller tracks 37 and plate 63 to facilitate mounting of plate 63, if desired. As discussed above, if the vertical slots in roller tracks 37 are blocked, it may be necessary to remove a portion of channel iron 56 as shown to provide clearance for ladder 5 when raised enough to allow for the pin on slide bolt 67 to clear the top of horizontal bumper rail 126 when it is put back in storage position.

On the right side of FIG. 26, ladder 5 is shown in the storage position and secured there by an S-hook or similar mechanism extending between the ladder's bottom step and the trailer framing 59 and/or roller track 37. One of ordinary skill in the art will know that other structures can be implemented to hold ladder 5 in the storage position. The ladder 5 may be mounted in any of the three positions shown in FIG. 26 depending on which position is most advantageous to the user.

Figure 27:
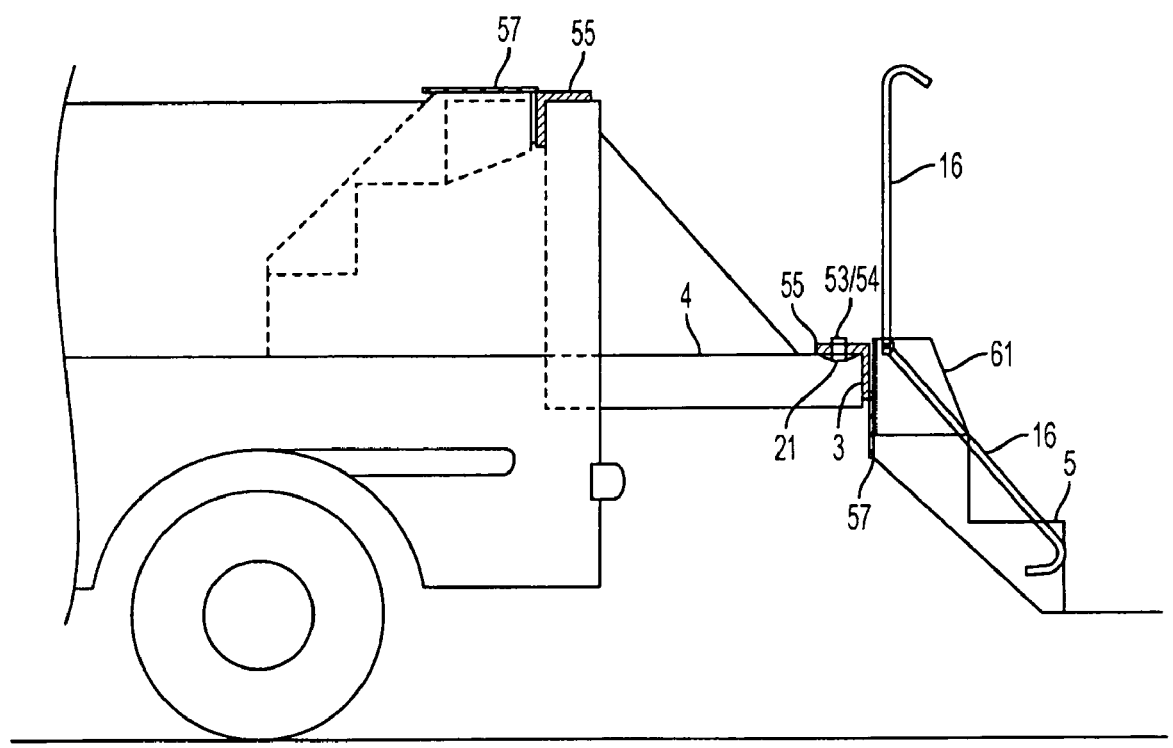
FIG. 27 depicts an exemplary side view of an exemplary staircase type ladder in an open position and attached to an open tailgate of a pickup type vehicle, and also depicts the staircase type ladder in an exemplary storage position inside a bed of a pickup type vehicle.

FIG. 27 shows an exemplary three-step version of ladder 5 attached to an open tailgate. The ladder 5 is shown in solid lines in the user-ready position, and in hidden lines in the storage position inside the truck bed. When in the user-ready position, the user support railings 16 can be left in the storage position at the side rails of ladder 5, or alternatively in the user-ready position. Ladder 5 can be mounted to the horizontal leg of angle iron 55 that is secured to the top side 4 of the tailgate, for example, by toggle bolts 21 or other fasteners extending through the top face 4 of the tailgate by one side of hinges 53. The other side of hinges 53 can be attached on the outside face of backdrop 61, for example, located behind and above the top step of ladder 5. One side of hinge 54 can be attached to the horizontal leg of angle iron 55 that is secured to the top side 4 of the tailgate, for example, by toggle bolts 21 or other fasteners extending through the top face 4 of the tailgate. The other side of hinge 54 can be attached to the outside vertical face of rectangular ladder holding plate 57. Rectangular ladder holding plate 57 can be adapted and configured such that when it is in the vertical position firmly against the outside vertical section of angle iron 55 (i.e., between the face 3 of the tailgate and the backdrop 61 of ladder 5), ladder will be held firmly in its user-ready position. When the tailgate is in the vertical or closed position, ladder 5 can be located in the storage position inside the bed of the vehicle. According to one exemplary embodiment, ladder holding plate 57 can be secured to the backdrop 61 of ladder 5, for example, by screws, bolts, or other fasteners extending through backdrop 61 and plate 57.

Figure 28:
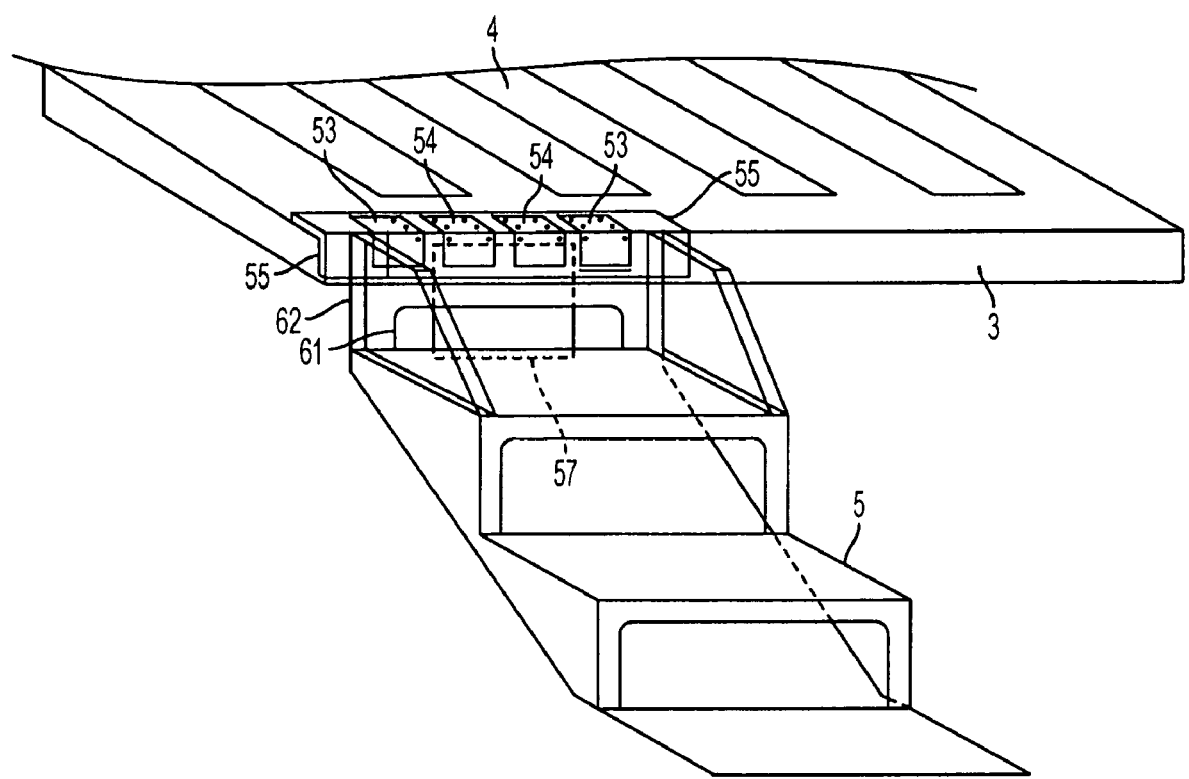
FIG. 28 depicts an exemplary isometric view of an exemplary staircase type ladder mounted via hinges to the top face of an open tailgate of a pickup type vehicle.

FIG. 28 is an isometric view of the ladder 5 of FIG. 27. Ladder 5 is shown in the user-ready position supported by backdrop 61. Backdrop 61 can be located behind and above the top step of ladder 5, for example, formed integrally with ladder 5 bracing or connected thereto. Backdrop 61 can rest firmly against rectangular ladder holding plate 57 when in the user-ready position. Ladder holding plate 57 is shown in the vertical position against the outside vertical face of angle iron 55, which is mounted against the outside face 3 of the tailgate. One side of each set of hinges 53 and 54 can be attached to the topside of the horizontal leg of angle iron 55, which in turn is secured to the top surface 4 of the tailgate, for example, by toggle bolts 21 or other fasteners. The other side of each of hinges 53 can be secured to the outside surface of backdrop 61 of ladder 5. Alternatively, the other side of hinges 54 can be secured to the outside surface of the rectangular holding plate 57 that is firmly against vertical leg of angle iron 55 when tailgate is in the open position.

Figure 29:
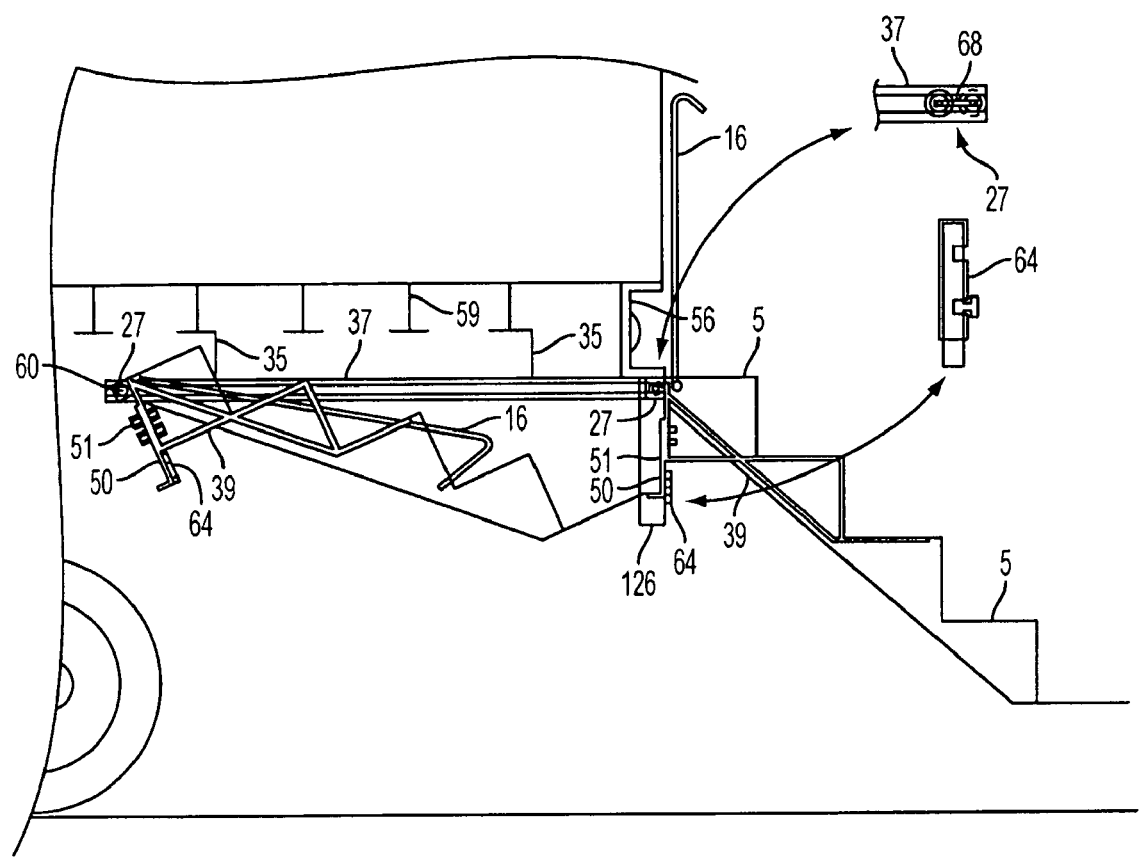
FIG. 29 depicts an exemplary side view of an exemplary staircase type ladder which may be secured adjacent to the bed or end of an enclosed tractor trailer like vehicle, wherein the ladder is depicted in a user-ready position, and is also depicted in an exemplary storage position under the bed of the trailer.

FIG. 29 depicts a side view of another exemplary embodiment of a five step ladder similar to that shown in FIG. 25 and described in connection therewith. Ladder 5 is shown in both the user-ready position and the storage position. Compared to the ladder of FIG. 25, the ladder 5 of FIG. 29 includes the first ladder bracket 39, but not the second ladder bracket 52. In addition, the roller track 37 of FIG. 29 does not include the optional vertical slot of FIG. 25. In addition, as shown in the inset portion of FIG. 29, one or more additional rollers 27 may be provided in series behind each set of lead rollers 27. The lead rollers 27 may be coupled to the additional rollers 27, for example, by a metal strip riveted in place. The additional rollers 27 may ease the transition of ladder 5 from the open user-ready position to the storage position or visa versa.

Figure 30:
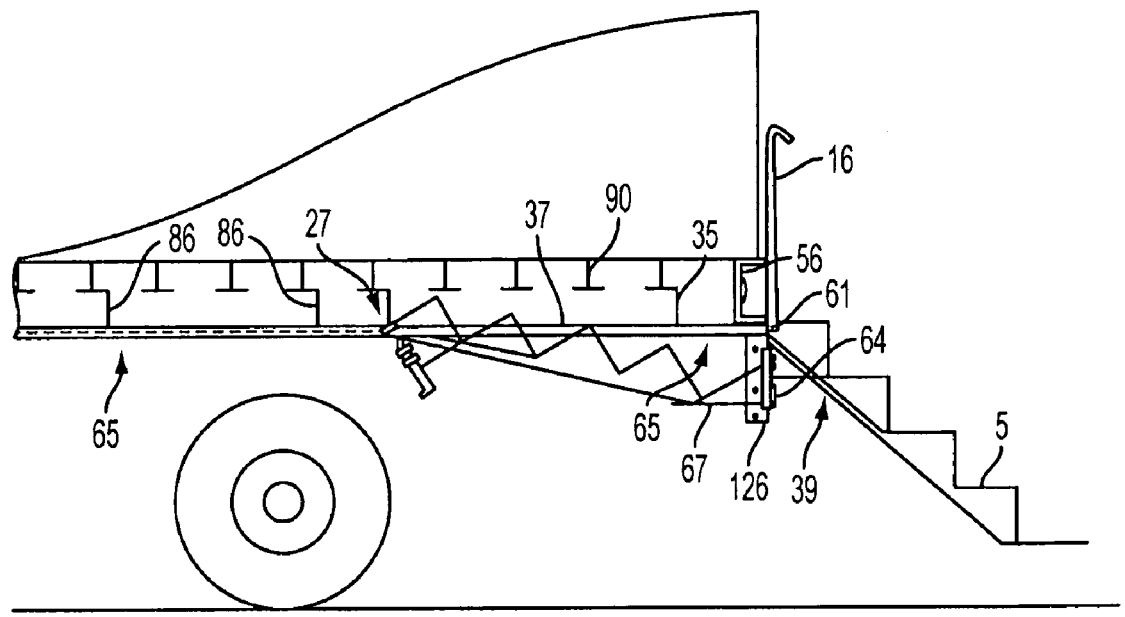
FIG. 30 depicts an exemplary side view of an exemplary staircase type ladder mounted to a trailer frame and including an exemplary pneumatic cylinder that can permit movement of the ladder from an open position to a storage position under the trailer and visa versa.
Figure 31:
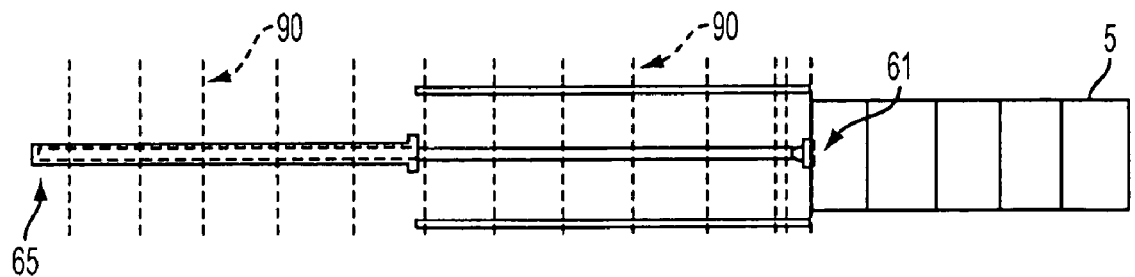
FIG. 31 depicts an exemplary top view of an exemplary staircase type ladder mounted to a trailer frame and including an exemplary pneumatic cylinder that can permit movement of the ladder from an open position to a storage position under the trailer and visa versa.

FIG. 30 is a side view and FIG. 31 is a top view of an exemplary five step version of ladder 5 having an actuator mechanism to move ladder 5 from the storage position to the user-ready position, and vice versa. The actuator can comprise a pneumatic cylinder 65 having one end (e.g., the piston end) attached to the backdrop 61 of ladder 5. The other end of cylinder 65 can be secured to the tractor framing 59. Cylinder 65 can be located between the two sets of roller rails 37, as shown in FIG. 31, however other locations are possible.

When the piston of cylinder 65 is in an extended position (e.g., fully extended), the ladder 5 will be located in the user-ready position. Retracting the cylinder piston can return the ladder 5 to the storage position. When ladder 5 is returned to the storage position, its bottom step can rest on a horizontal plate 67 that is mounted to the bumper rail 126. The upper surface of plate 67 can be located at substantially the same elevation as the upper horizontal surface of bumper rail 126, as shown. Preferably, plate 67 is wide and long enough to engage and retain the bottom step of ladder 5, in order to hold ladder 5 in the storage position. Pneumatic cylinder 65 can be powered by compressed air provided by the vehicle. Alternatively, cylinder 65 may be a hydraulic cylinder. According to another exemplary embodiment, instead of a cylinder, the actuator mechanism can comprise a motor driven chain and sprocket system, a screw mechanism, or other linear actuator device known in the art.

Figure 33:
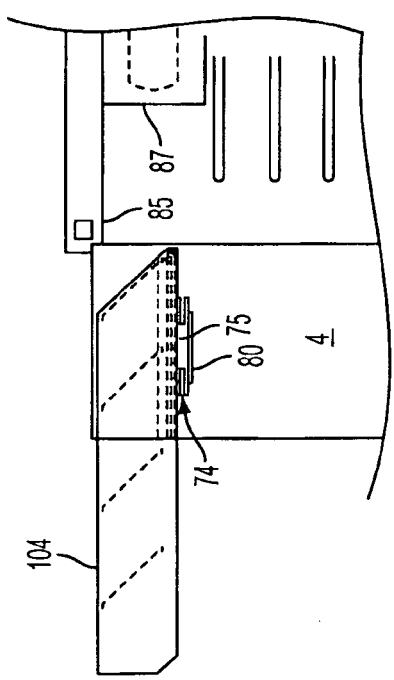
FIG. 33 depicts an exemplary top view of the ladder of FIG. 32, wherein the ladder is in an exemplary storage position, and wherein the rotator unit and ladder have been rotated upwards by approximately 90 degrees to a position where they are substantially perpendicular to the truck tailgate.

FIG. 32 depicts a side view of an exemplary embodiment of a non-collapsible staircase type ladder 104 in a user-ready position. As shown, the apparatus can be positioned on a truck tail gate 4 with the top step 6 of ladder 104 located at approximately the same elevation as the upper surface of the open truck tailgate 4, although other configurations are possible. Ladder 104 can include a pair of opposing side rails 5 supporting a number of steps 6, for example, four steps 6 as shown in FIG. 33. The side rails 5 can extend downward beyond the bottom step 6 and rest, for example, on a surface such as the ground or a loading dock. Ladder 104 can include one or more retractable user-support arms 16, for example, as described above in connection with previous embodiments.

The steps 6 of ladder 104 may comprise, for example, a corrugated type material, while the side rails 5 may comprise, for example, a flat sheet of material formed into channel iron or other like configuration. The steps 6 and side rails 5 can be rigidly joined together, for example, by welding, bonding, riveting, bolting, or other known methods. Although ladder 104 may comprise separate parts rigidly joined together, it is still a one-piece, non-collapsible staircase type ladder in accordance with the way the term "one-piece, non-collapsible staircase type ladder" has been throughout the specification. Ladder 104 may alternatively be formed, for example, from a single piece of molded plastic, fiberglass, aluminum plate, diamond plate, stainless steel, or other materials known in the art.

Still referring to FIG. 32, ladder 104 can be attached to the tailgate 4 via a rotator unit 74, for example, to facilitate rotation of the ladder 104 about a substantially vertical axis Z. Rotator unit 74 can include an upper portion 74a and a lower portion 74b that rotate with respect to one another about axis Z. For example, the upper and lower portions 74a, 74b can be connected by an axle, one or more bearing, and/or other structures known in the art to provide for rotational movement.

Rollers 70 may be attached to ladder 104, as will be described in more detail below with respect to FIG. 32A. Rollers 70 may be retained inside opposed travel rails 72, which may be mounted, for example, to the upper portion 74a of the rotator unit 74, for example, using conventional fastening means.

An actuator mechanism, such as those shown and described in connection with FIGS. 30 and 31, can be provided to move ladder 104 on the travel rails 72 from the storage position to the user-ready position, and vice versa.

Rotator unit 74 can be mounted to the upper surface of the tailgate 4. For example, according to an exemplary embodiment, the lower portion 74b of rotator unit 74 can be secured to a rotator unit holding plate 80, for example, by bolts, rivets, welding, or other known techniques. Rotator unit holding plate 80 can, in turn, be secured to the tailgate 4 via one or more hinges 75, or other pivoting structures known in the art. According to an exemplary embodiment, one side of hinge 75 can be fastened to the rotator unit holding plate 80, and the other side of hinge 75 can be fastened to the upper surface of the tailgate 4. A detent or other type of mechanism may be provided to releasably retain the upper portion 74a of rotator unit 74 in predetermined angular positions with respect to the lower portion 74b about axis Z, for example, in 90 degree increments.

Rollers 70 can travel within travel rails 72 to allow the ladder 104 to be moved forward and backward (e.g., to the left and right in FIG. 32) between a user-ready position (shown), and various storage positions (see, e.g., FIG. 33). In the exemplary user-ready position shown in FIG. 32, the rollers 70 are located all the way rearward in travel rails 72 against the closed rear end face of the travel rails 72.

The hinge 75 mounted on the upper surface of the tailgate 4 allows a user to turn the rotator unit holding plate 80 (and rotator unit 74 with it) upward by up to approximately 90 degrees with respect to the upper surface of the tailgate 4, for example, to the position shown in FIG. 33.

One of ordinary skill in the art will appreciate that the apparatus can be secured to the tailgate 4, or other part of an automobile or other structure, at locations other than those shown in FIGS. 32-37. One of ordinary skill in the art will also appreciate that the hinge 75 can be oriented in other positions that shown, for example, to provide additional or alternative storage positions.

FIG. 32A depicts an enlarged view of ladder travel rail 72 with roller 70 retained therein. As shown, roller 70 can be secured within travel rail 72 by roller retaining bolt 86, which can extend through travel rail 72, for example, near its rear end. Alternatively, roller 70 can be restrained within travel rail 72 by closing off the rear end of travel rail 72, for example, by welding a plate over all or a portion of the end of travel rail 72. Roller 70 can be attached to ladder 104, for example, by a shaft that extends from roller 70 and is secured inside a roller holding bracket 71 secured to ladder 104, for example, behind and/or underneath the top step, although other configurations are possible.

FIG. 33 depicts ladder 104 in an exemplary storage position on an open tailgate 4, wherein rotator unit holding plate 80 has been rotated upwards by approximately 90 degrees from the user-ready position via hinge 75. In this exemplary position, the outside face of the left side rail 5 of ladder 104 is substantially flush against the upper surface of tailgate 4. In this exemplary position, the outside front face of ladder 104 is in line with the inside face of vertical side rail 85 of the pickup bed, providing a substantially unencumbered tailgate 4, and/or providing substantially unencumbered access to the truck bed when the tailgate 4 is open. When the tailgate 4 is closed, the ladder apparatus may be located in the space behind the wheel well 87, leaving a majority of the truck bed unencumbered.

Figure 34:
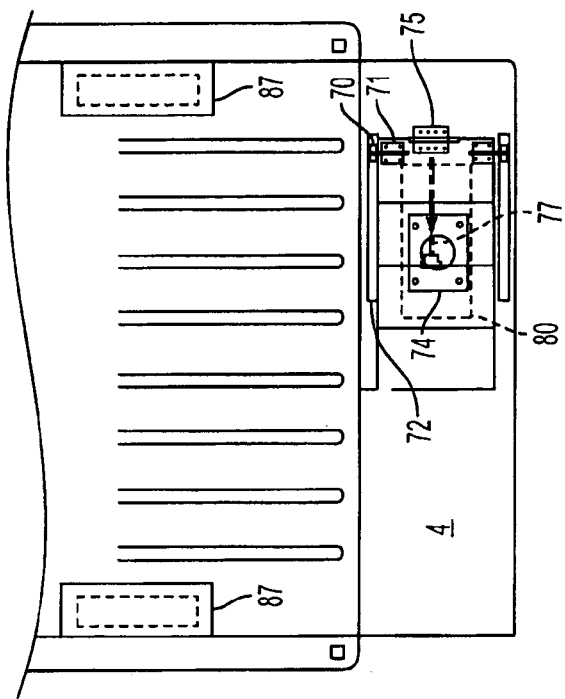
FIG. 34 depicts an exemplary top view of the ladder of FIG. 32, wherein the ladder is in another exemplary storage position, and wherein the ladder has been rotated approximately 90 degrees from the user-ready position via the rotator unit.

FIG. 34 depicts a top view of ladder 104 in an exemplary storage position on open tailgate 4. Ladder 104 has been pushed all the way forward on travel rails 72. Ladder 104 has also been rotated approximately 90 degrees from the user-ready position about axis Z via rotator unit 74, placing the ladder 104 on the upper surface of the open tailgate 4. When the tailgate 4 is closed, the ladder 104 may be completely concealed inside the truck bed, as shown, for example, in FIG. 37.

Figure 35:
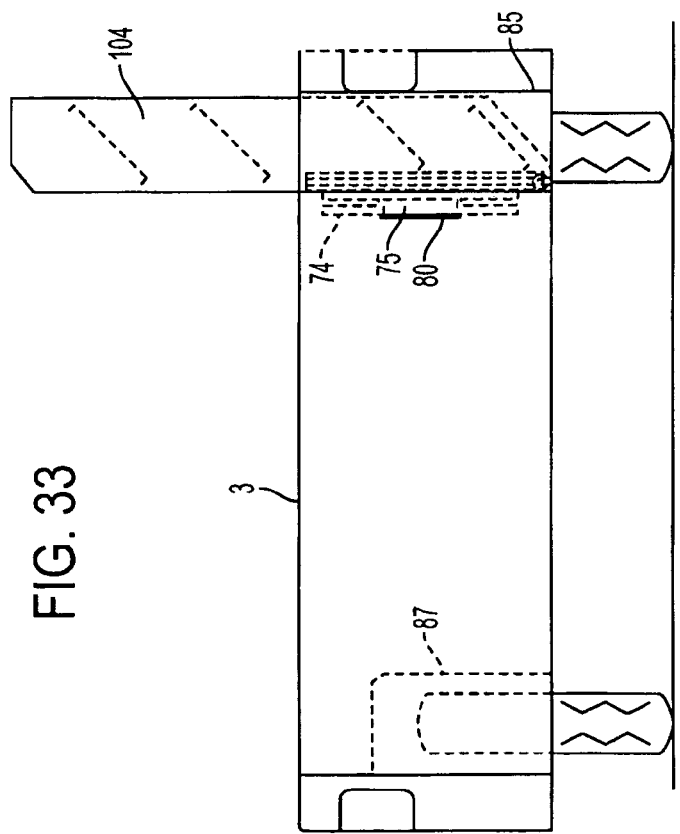
FIG. 35 depicts an exemplary rear view of the ladder of FIG. 32, wherein the ladder is in the exemplary storage position of FIG. 33, and wherein the truck tailgate is closed, thereby partially concealing the ladder inside the truck bed.

FIG. 35 depicts a rear view of the ladder 104 mounted to tailgate 4, which is in a closed position. Rotator unit holding plate 80 has been turned up approximately 90 degree via hinges 75, thereby locating the right side rail 5 of ladder 104 against the upper surface of tailgate 4. In this exemplary storage position, the top face of ladder step 104 may be located against the inside vertical wall 85 of the truck bed, tucked behind the wheel well 87, leaving a substantial portion of the truck bed unencumbered.

Figure 36:
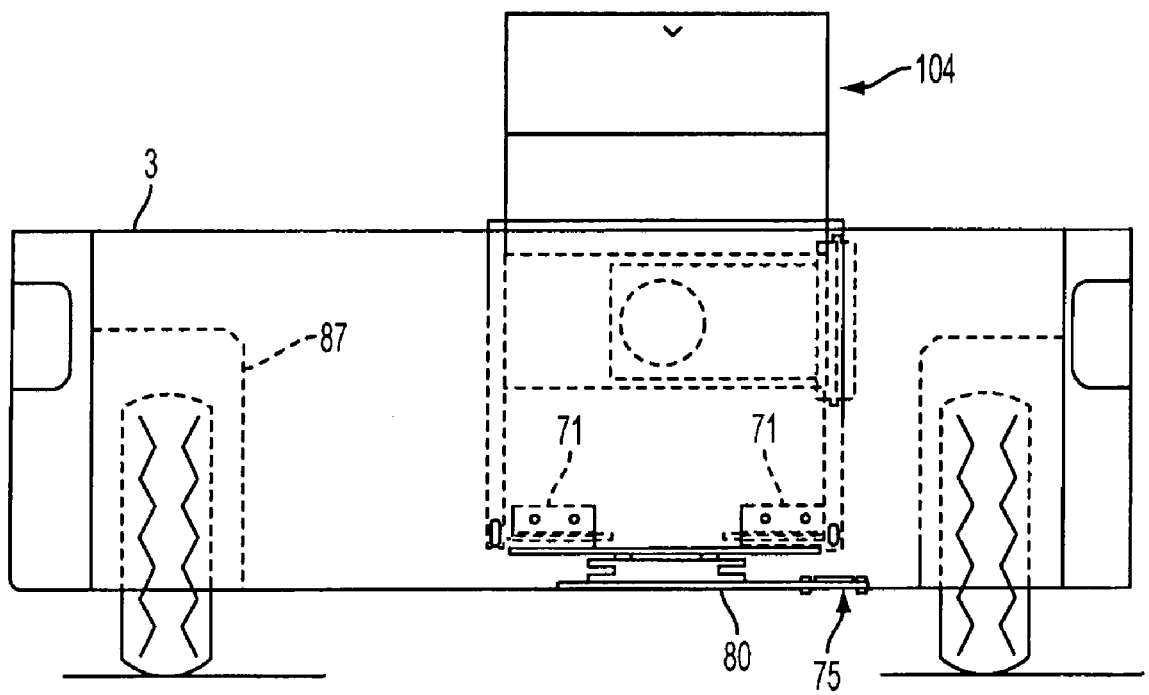
FIG. 36 depicts an exemplary back view of the ladder of FIG. 32, wherein the ladder is in an exemplary storage position, and the truck tailgate is closed.
Figure 37:
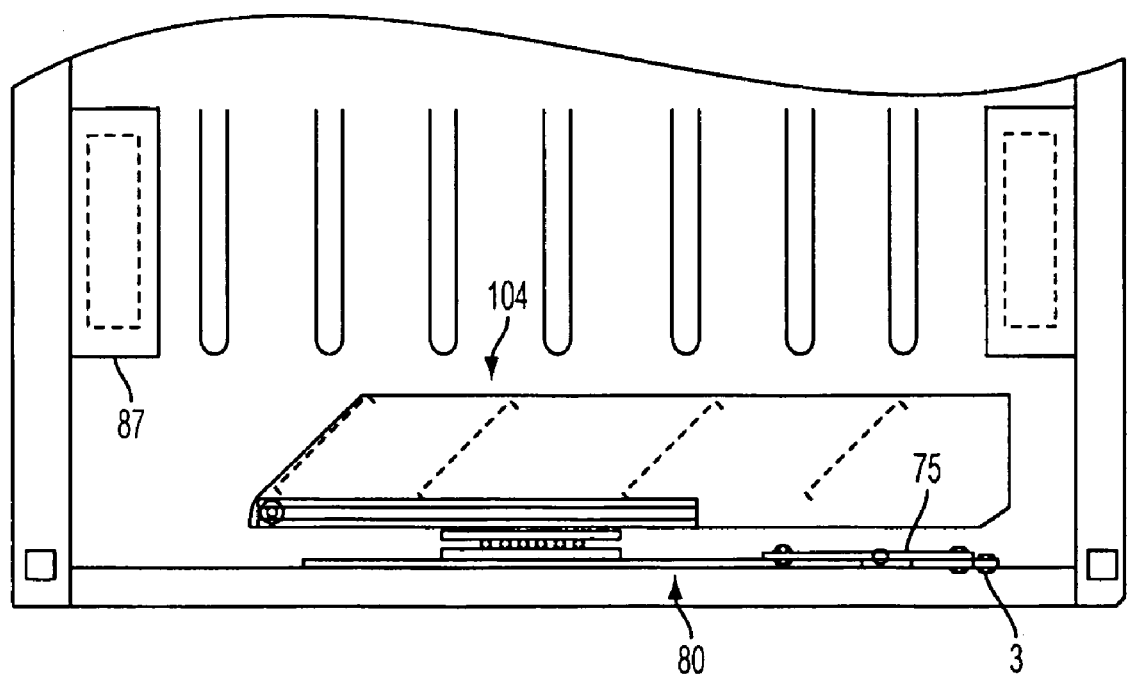
FIG. 37 depicts an exemplary top view of the ladder of FIG. 32, wherein the ladder is in the exemplary storage position of FIG. 34, and wherein the truck tailgate is closed, thereby concealing the ladder inside the truck bed.

FIG. 36 depicts ladder 104 in another exemplary storage position, wherein the ladder 104 has been pushed all the way forward on travel rails 72, and the tailgate has been closed. In this exemplary position, ladder 104 extends substantially vertically (aligned with closed tailgate 4) and is partially concealed within the truck bed.

One of ordinary skill in the art will appreciate that the apparatus can be secured to the tailgate 4, or other part of an automobile or other structure, at locations other than those shown in FIGS. 32-37. One of ordinary skill in the art will also appreciate that the hinge 75 can be oriented in other positions than those shown, for example, to provide additional or alternative storage positions.

Figure 38A:
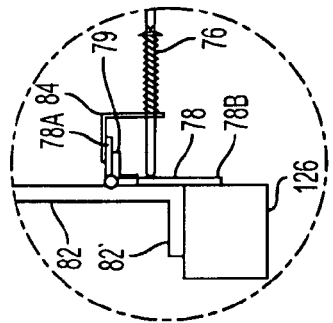
FIG. 38A depicts an exemplary enlarged portion of the ladder of FIG. 38, showing an exemplary hinge holding plate holding the ladder in the user-ready position.
Figure 38B:
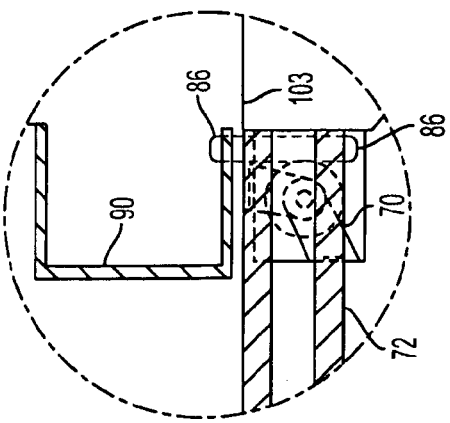
FIG. 38B depicts an exemplary enlarged portion of the ladder of FIG. 38, showing an exemplary roller mounted inside an exemplary travel rail.
Figure 38:
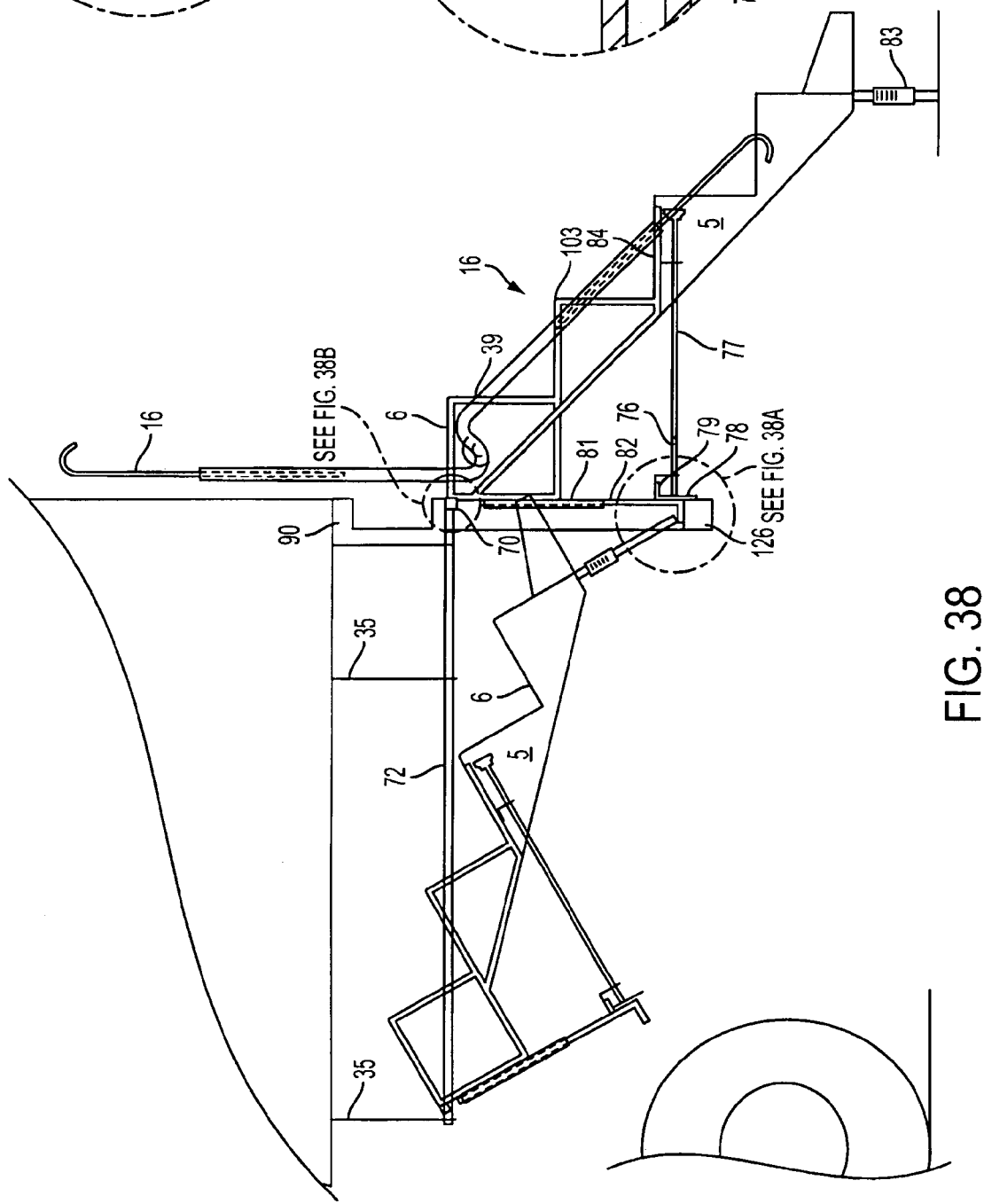
FIG. 38 depicts an exemplary side view of an exemplary staircase type ladder of the present invention which may be secured to the bed or end of an enclosed tractor trailer-like vehicle, wherein the ladder is depicted in an exemplary user-ready position, and is also depicted in an exemplary storage position under the bed of the trailer.

FIG. 38 depicts a side view of an exemplary embodiment of a five step version of a non-collapsible staircase type ladder 103 in both a user-ready position and a storage position under a tractor trailer type vehicle. One of ordinary skill in the art will appreciate that the ladder 103 is not limited for use with a tractor trailer, and that it can alternatively be used with other types of vehicles or structures. As shown, the apparatus can be mounted to the tractor trailer with the top step 6 of ladder 103 located one step below the deck of the trailer, when the apparatus is in the user-ready position, shown. One of ordinary skill in the art will appreciate, however, that other locations of the top step are possible. The ladder 103 shown in FIG. 38 is in many ways similar to the ladder shown and described in connection with FIG. 25, with differences described below.

According to an exemplary embodiment, ladder 103 can include one or more telescoping adjustable brackets that hold ladder 103 in the user-ready position. The telescoping adjustable brackets can be adjustable in length, for example, using cooperating screw threads, detents, or other known arrangements. An exemplary telescoping adjustable bracket shown in FIG. 38 can include an upper section 81 attached to a non-collapsible ladder brace 39 on the ladder 103, and a telescoping lower section 82 extending from the upper section. As shown, the lower section 82 can include, for example, a lower horizontal projection 82', as shown in FIG. 38A. The lower horizontal section 82' can rest against the trailer's bumper bar 126 to hold the ladder 103 in the user-ready position, as shown in FIGS. 38 and 38A. According to an exemplary embodiment, the telescoping lower section 82 of telescoping adjustable bracket can have a range of adjustable lengths sufficient to allow it to accommodate any vertical height of the top surface of the trailer's bumper bar 126.

An exemplary embodiment can include a hinged ladder holding plate 78 to assist in retaining the ladder in the user-ready position. For example, as shown in FIG. 38A, the hinged holding plate 78 can be mounted to an angle iron 79 or similar structure mounted to the telescoping lower section 82 of the telescoping adjustable bracket. The hinged ladder holding plate 78 can have a horizontal section 78a and a perpendicular section 78b that are pivoted together, for example, by a hinge (e.g., a piano hinge or other type of hinged connection known in the art), as shown in FIG. 38A. The horizontal section 78a of the hinged holding plate 78 can be attached to the horizontal portion of the angle iron 79 in such a position that the perpendicular section 78b of the hinged holding plate 78 lays substantially vertically against the perpendicular portion of angle iron 79 and is in between the telescoping lower sections 82 of the telescoping adjustable bracket. According to an exemplary embodiment, surface engagement between the perpendicular section 78b and the outside vertical face of bumper bar 126 holds the ladder 103 in the user-ready position.

According to the exemplary embodiment shown, in order to move the ladder 103 from the user-ready position to a storage position, the horizontal surface of the top step 6 must be kept substantially horizontal until it clears the channel iron 90 located directly above it. Accordingly, a holding plate activator can be provided to facilitate disengagement of the perpendicular section 78b and the outside vertical face of bumper bar 126. For example, the holding plate activator can include a spring loaded activator rod 77, which can be slidably secured to the ladder 103 and/or the top horizontal portion 78a of holding plate 78, for example, via retaining brackets 84, although other mounting structures are possible. The activator rod 77 can be pushed forward by a user against section 78b of hinged holding plate 78 to raise section 78b upward (provided the ladder 103 is first lifted to provide adequate clearance between section 78b and the bumper bar 126). When section 78b is raised sufficiently to clear the upper surface of horizontal bumper bar 126, (see FIG. 39A), the user can push apparatus 103 straight back on rollers 70 with the top step 6 clearing the channel iron 90. Once the top step 6 clears the channel iron 90, the user can continue to push ladder 103 forward until the ladder 103 is in the storage position shown (e.g., wherein the rollers 70 are abutted against the closed (left) end of travel rails 72). When the user releases the activator rod 77, compression spring 76 will relax, allowing the perpendicular section 78b of the hinged holding plate 78 to return to its original position (e.g., against the vertical surface of telescoping lower section 82).

As shown in the enlarged view of FIG. 38B, an exemplary embodiment can retain the rollers 70 in the travel rails 72 via the bolt 86 penetrating the travel rail 72, although other configurations are possible. Bolt 86 can also secure the rear end of the travel rails 72 to the bracket 90 that supports the vertical legs of the bumper bar 126, although other configurations are possible.

Still referring to FIG. 38, an exemplary embodiment can include a telescoping bracket 83 that can be attached, for example, to the underside of the ladder 103 to support the bottom step of ladder 103 above the support surface (e.g., the ground) in the user-ready position. Bracket 83 can comprise a single U-shaped bracket with the bottom of the "U" resting on the ground, as shown. Alternatively, bracket 83 can comprise one or more individual, straight brackets extending from the ladder 103 to the ground. According to an exemplary embodiment (not shown), the bracket 83 can be hinged to the bottom step 6 of the ladder 103, allowing the bracket to retract away from the surface (e.g., to a position against the bottom surface of the ladder 103). When the bracket 83 is retracted, it can provide a clearance sufficient to allow the operator to drive the trailer with the ladder 103 in the user-ready position.

Ladder 103 can include one or more user-support arms 16, which may be the same or similar to those described in connection with previous embodiments. An actuator mechanism, such as those shown and described in connection with FIGS. 30 and 31, can be provided to move ladder 103 on the travel rails 72 from the storage position to the user-ready position, and vice versa.

FIG. 39 is substantially the same as FIG. 38, with the addition of a handrail 89 mounted on the inside face of one of the rear doors of the trailer, for example, by screws, bolts, or rivets. The handrail 89 can be located on the door in a position that allows it to be easily grasped by an operator-climbing the ladder 103 in its user-ready position, for example, when entering or exiting the trailer. A latch, dead bolt, or other structure can be provided to secure the door in a predetermined position where the handrail 89 can be easily grasped by a user, for example, 90 degrees from its closed position.

FIG. 40 depicts another exemplary embodiment of a five step version of a non-collapsible staircase type adder 105 in both a user-ready position and a storage position under a tractor trailer type vehicle. One of ordinary skill in the art will appreciate that the ladder 105 is not limited to use with a tractor trailer, and that it can alternatively be used with other types of vehicles or structures. The steps 6 of ladder 105 may be constructed from, for example, a corrugated aluminum, and the side rails 5 can be constructed from, for example, flat sheet aluminum. The steps and side rails can be rigidly joined together, for example, by welding, bonding, riveting bolting, or other known methods. Although ladder 105 may comprise separate parts rigidly joined together, it is still a one-piece, non-collapsible staircase type ladder in accordance with the way the term "one-piece, non-collapsible staircase type ladder" has been throughout the specification. Ladder 105 may alternatively be formed, for example, from a single piece of molded plastic, fiberglass, aluminum plate, diamond plate, stainless steel, or other materials known in the art. As shown in FIG. 40, the apparatus can be attached to the trailer with the top step 6 of ladder 105 located one step below the level of the trailer bed, however, other configurations are possible. An adjustable bracket 83 may be provided to support the bottom step of ladder 105 above the support surface. Bracket 83 is the same as that shown and described in connection with FIG. 38, and will not be described in more detail herein. Ladder 105 can include one or more user-support arms 16, which may be the same or similar to those described above in connection with previous embodiments.

Ladder 105 may include one or more ladder braces 99 attached to the underside of ladder 105, for example, by attachment to side rails 6 via welding, bolts, rivets, bonding, or other known fasteners. As shown in FIG. 40, ladder braces 99 may be substantially triangular in shape, although other configurations are possible. One or more the telescoping adjustable brackets 100 can hold the ladder 105 in the user-ready position by engaging the horizontal bumper bar 126 of the trailer, as shown. According to an exemplary embodiment, each telescoping adjustable bracket 100 can include an upper portion 100A attached to the ladder braces 99, for example, by bolts, rivets, welding, bonding, or other known fastening techniques. Each bracket 100 can further include a telescoping lower portion 100B that extends from the upper portion 100A and is adjustable in length. For example, a detent mechanism, cooperating threads, or other known structures can be utilized to provide the telescoping action of the bracket 100.

The one or more telescoping adjustable brackets 100 can hold ladder 105 in the user-ready position, for example, by engagement with the trailer's horizontal bumper bar 126. According to the exemplary embodiment shown in FIG. 40A, the telescoping lower portion 100B of each adjustable bracket 100 can include a substantially horizontal extension 101A and a substantially vertical extension 101B, which can rest on the upper horizontal face and outside vertical face of the bumper bar 126, respectively, to hold the ladder 105 in the user-ready position. The exemplary embodiment depicted in FIGS. 40 and 40A can hold the ladder 105 in the user-ready position without the need for a hinged holding plate, as in the embodiment of FIGS. 38 and 39. According to an exemplary embodiment, the range of lengths of the telescoping adjustable bracket can be long enough to rest on a trailer's horizontal bumper bar 126 over a wide range of vertical heights of the bumper bar 126. According to an exemplary embodiment, the substantially vertical extension 101B can be relatively short, for example, approximately ¼" to ¾" in height, to facilitate returning the ladder 105 to the storage position without the top step 6 interfering with the bracket 90.

An actuator mechanism, such as those shown and described in connection with FIGS. 30 and 31, can be provided to move ladder 105 on the travel rails 72 from the storage position to the user-ready position, and vice versa.

FIGS. 41-44 depict another exemplary embodiment of a ladder 106 according to the present invention. The ladder of FIGS. 41-44 may be suitable for use as a ladder on vehicles, for example, vehicles that are not equipped with a horizontal bumper bar. This may be advantageous, for example, on personnel transport type vehicles, such as those used for the transportation of military troops, road gangs, and other general public use, which are often without a horizontal bumper bar. The ladder 106 may alternatively be used on vehicles that do have a horizontal bumper bar, such as tractor trailer type vehicles.

Figure 41:
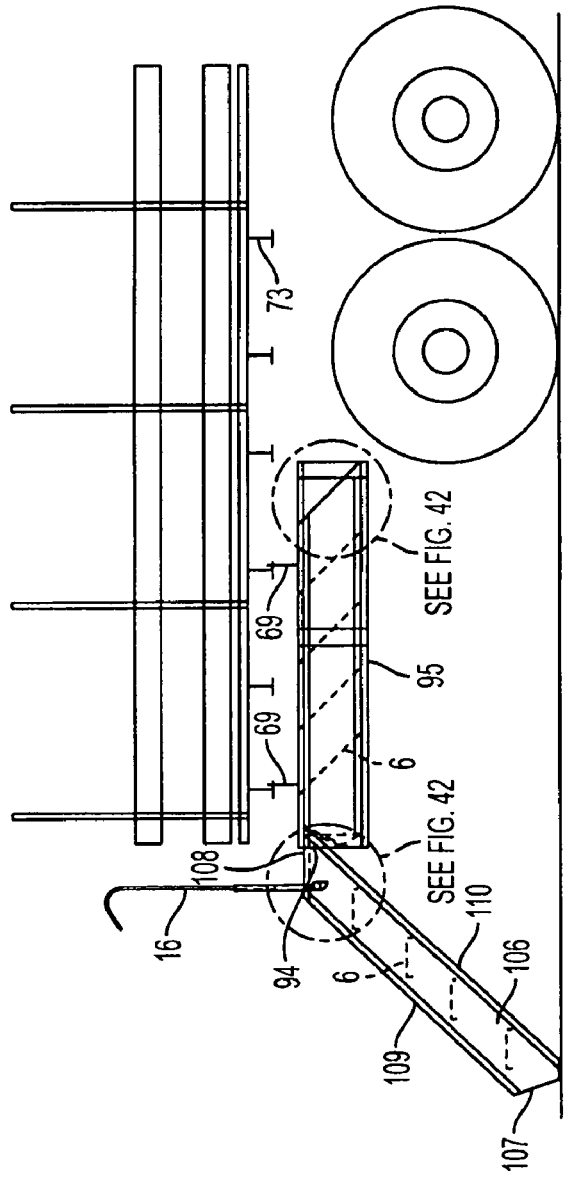
FIG. 41 depicts an exemplary side view of an exemplary staircase type ladder of the present invention which may be secured to the bed or end of an enclosed tractor trailer like vehicle, wherein the ladder is depicted in an exemplary user-ready position, and is also depicted in an exemplary storage position under the bed of the trailer.

FIG. 41 depicts an exemplary side view of ladder 106 in a user-ready position and a storage position underneath a transport type vehicle. The apparatus can include a ladder storage rack 95 adapted to couple the ladder 106 to a substantially horizontal surface, for example, underneath the bed of a personnel transport vehicle, or underneath the trailer of a tractor trailer type vehicle. According to an exemplary embodiment, the ladder storage rack 95 can comprise two sets of spaced apart horizontal angle irons attached and separated by vertical and horizontal stanchions, so as to form a rectangular shaped box type frame, although other configurations are possible. The ladder storage rack 95 can be substantially box-shaped and can include at least one open end adapted to receive the non-collapsible single unit stair 106. Ladder storage rack 95 can have open side walls, or alternatively, can be completely enclosed.

Still referring to FIG. 41, storage rack 95 can be attached to the vehicle by bolts 69 or other fasteners that extend between the rack 95 and the vehicle underside, for example, I-beams 73. Alternatively, storage rack 95 can be welded directly to the vehicle's undercarriage, or attached using other techniques known in the art.

Figure 44:
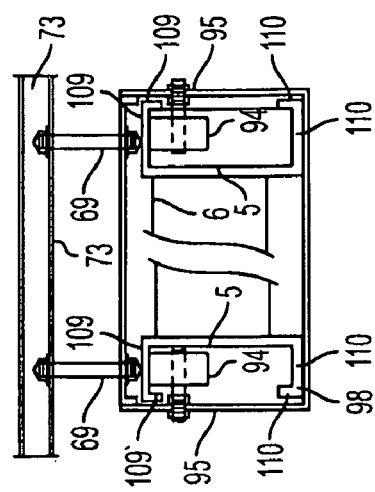
FIG. 44 depicts an exemplary rear view of the ladder of FIG. 41, wherein the ladder in an exemplary storage position.

Storage rack 95 can include stationary rollers 94 (see, in particular, FIG. 44), which may support the non-collapsible single unit stair 106, as will be described in more detail below. The stationary rollers 94 can be located inside the box-shaped storage rack 95, as shown in FIG. 44, however, other configurations are possible.

Figure 42:
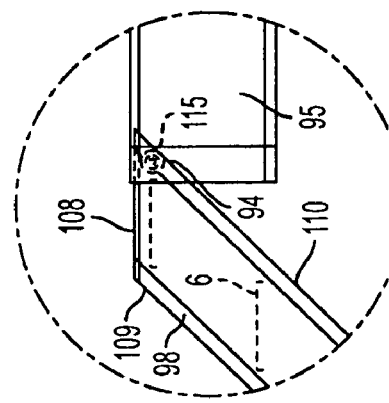
FIG. 42 depicts an exemplary enlarged portion of the ladder of FIG. 41, wherein the ladder is in an exemplary user-ready position.

The ladder 106 may include travel rails 98 located on each of its side rails 6. The travel rails 98 can be substantially channel-shaped, as shown in FIG. 44, and can support the ladder 106 on stationary rollers 94. For example, as shown in FIG. 42, each travel rail 98 can include a horizontal flange portion 109 extending outwardly from the respective side rail 6, and can further include a terminal portion 109' extending downwardly, although other configurations are possible. The travel rails 98 can be formed integrally with the side rails 6, as shown, or alternatively, they can be separate pieces of material attached to the side rails, for example, by welding, bonding, or, by using fasteners such as bolts or screws. Lower travel rails can also be provided, as shown, for example, in FIG. 44, and can include horizontal flange portions 110 and terminal portions 110'.

Figure 43:
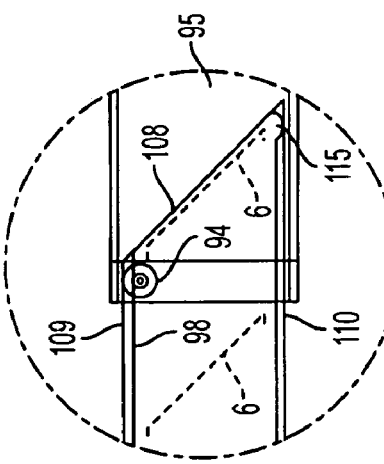
FIG. 43 depicts an exemplary enlarged portion of the ladder of FIG. 41, wherein the ladder is between an exemplary user-ready position and an exemplary storage position.

Referring to FIGS. 41-43, ladder 106 can include upper stop plates 108, which close off the ends of the travel rails 98 at the proximal end of ladder 106. Ladder 106 can further include lower stop plates 107, which can close off the ends of travel rails 98 at the distal end of ladder 106.

The travel rails 98 can travel on rollers 94 to facilitate movement of the ladder 106 between the user-ready position and the storage position, both of which are shown in FIG. 41, for example, by rolling within the respective rails 98.

FIG. 42 depicts the ladder 106 in the user-ready position. In this position, rollers 94 can be positioned against the underside of the respective upper stop plate 108 and against the inside face of the terminal portion of each flanged portion 110. Each flanged portion 110 can include a detent 115, or similar structure, adapted to retain the roller 94 and releasably secure the ladder 106 in the user-ready position. In the exemplary user-ready position shown, at least a portion of each lower stop plate 107 is laying substantially flush against the surface beneath the vehicle (e.g., on the ground), although other configurations are possible.

Referring to FIG. 42, the ladder 106 may be slid forward (to the right in FIG. 42), thereby disengaging rollers 94 from the respective detents 115, causing the upper stop plate 108 to advance forward on stationary rollers 94 until the rollers 94 are on the inside face of the respective flanged portions 109. At this point, the distal end of the ladder 106 may be raised to a substantially horizontal position, as shown in FIG. 43.

FIG. 43 depicts the ladder 106 horizontally positioned and ready to slide into the storage position in the storage rack 95, for example, by pushing it forward (to the right in FIG. 43). Ladder 106 can include one or more user-support arms 16, which may be the same or similar to those described in connection with previous embodiments. The user support arms 16 may be moved into a storage position prior to moving the ladder 106 into the storage position.

An actuator mechanism, such as those shown and described in connection with FIGS. 30 and 31, can be provided to move ladder 106 from the storage position to the user-ready position, and vice versa.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

The invention claimed is:

1. An apparatus, comprising:
   a non-collapsible single unit stair comprising: a pair of opposing side rails supporting at least a top step and a bottom step;
   a pair of travel rails, wherein a travel rail is associated with each of the opposing side rails of the non-collapsible single unit stair; and
   a ladder rack adapted to couple the apparatus to a substantially horizontal surface, the ladder rack including a pair of stationary rollers;
   wherein the pair of stationary rollers roll within the pair of travel rails to permit movement of the non-collapsible single unit stair between a user-ready position and a storage position;
   further wherein the ladder rack is substantially box-shaped and includes at least one open end adapted to receive the non-collapsible single unit stair.

2. An apparatus, comprising:
   a non-collapsible single unit stair comprising: a pair of opposing side rails supporting at least a top step and a bottom step;
   a pair of travel rails, wherein a travel rail is associated with each of the opposing side rails of the non-collapsible single unit stair, and each of the pair of travel rails is substantially channel-shaped; and
   a ladder rack adapted to couple the apparatus to a substantially horizontal surface, the ladder rack including a pair of stationary rollers;
   wherein the pair of stationary rollers roll within the pair of travel rails to permit movement of the non-collapsible single unit stair between a user-ready position and a storage position;
   further wherein the non-collapsible single unit stair includes a proximal end and a distal end, and the apparatus further comprises an upper stop plate positioned at the proximal end of each side rail, wherein each upper stop plate closes off the proximal end of the respective channel-shaped travel rail.

3. The apparatus of claim 2, further comprising a detent located proximate each upper stop plate, each detent adapted to engage the respective stationary roller to retain the non-collapsible single unit stair in the user-ready position.

4. The apparatus of claim 2, further comprising a lower stop plate positioned at the distal end of each side rail, wherein at least a portion of each lower stop plate is angled to lay substantially flush against the ground when the non-collapsible single unit stair is in the user-ready position.

5. The apparatus of claim 1, wherein each of the pair of travel rails is integral with the respective side rail.

6. The apparatus of claim 1, wherein the pair of stationary rollers are located inside the ladder rack.

7. The apparatus of claim 1, further comprising:
   a height adjustable user-support arm, coupled to one of the side rails with a rotatable coupling, wherein the user-support arm is moveable between a support position and a storage position.

8. The apparatus of claim 7, further comprising a second height-adjustable user-support arm.

9. The apparatus of claim 1, wherein the opposing side rails of the non-collapsible single unit stair are connected to at least the top and bottom steps by fasteners, welding, or bonding.

10. The apparatus of claim 1, further comprising an actuator mechanism adapted to move the non-collapsible single unit stair between the user-ready position and the storage position.

11. The apparatus of claim 10, wherein the actuator mechanism comprises a pneumatic cylinder, a motor driven chain and sprocket system, a screw mechanism, or a linear actuator.

* * * * *